United States Patent
Hagiwara et al.

(10) Patent No.: US 6,904,427 B1
(45) Date of Patent: Jun. 7, 2005

(54) SEARCH SYSTEM AND METHOD BASED ON SEARCH CONDITION COMBINATIONS

(75) Inventors: Junichi Hagiwara, Kanagawa (JP); Tatsuya Shindo, Kanagawa (JP); Katsuhiko Taguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/484,911

(22) Filed: Jan. 18, 2000

(30) Foreign Application Priority Data

Apr. 30, 1999 (JP) ............................................ 11-123323

(51) Int. Cl.[7] .............................................. G06F 17/30
(52) U.S. Cl. ............................. 707/3; 707/10; 715/531
(58) Field of Search ..................... 707/1–10, 100–104.1, 707/200–206; 715/531, 780

(56) References Cited

U.S. PATENT DOCUMENTS

| | | | | |
|---|---|---|---|---|
| 4,811,199 A | * | 3/1989 | Kuechler et al. ............... | 707/3 |
| 5,123,103 A | * | 6/1992 | Ohtaki et al. ................... | 707/5 |
| 5,237,678 A | * | 8/1993 | Kuechler et al. ............... | 707/5 |
| 5,452,451 A | * | 9/1995 | Akizawa et al. ................ | 707/6 |
| 5,454,105 A | * | 9/1995 | Hatakeyama et al. .......... | 707/2 |
| 5,519,857 A | * | 5/1996 | Kato et al. ...................... | 707/5 |
| 5,752,016 A | | 5/1998 | Whittaker et al. .............. | 707/3 |
| 5,781,898 A | * | 7/1998 | Fukatsu et al. ................. | 707/4 |
| 5,799,184 A | * | 8/1998 | Fulton et al. ................... | 707/2 |
| 5,845,278 A | * | 12/1998 | Kirsch et al. ................... | 707/3 |
| 5,940,836 A | * | 8/1999 | Fukushima ............... | 707/104.1 |
| 5,940,842 A | * | 8/1999 | Sakuta ....................... | 707/513 |
| 6,085,185 A | * | 7/2000 | Matsuzawa et al. ............ | 707/2 |
| 6,094,647 A | * | 7/2000 | Kato et al. ...................... | 707/2 |
| 6,105,022 A | * | 8/2000 | Takahashi et al. .............. | 707/3 |
| 6,189,006 B1 | * | 2/2001 | Fukushima .................... | 707/6 |
| 6,226,632 B1 | * | 5/2001 | Takahashi et al. .............. | 707/3 |

FOREIGN PATENT DOCUMENTS

| | | |
|---|---|---|
| EP | 0627691 | 12/1994 |
| EP | 0627692 | 12/1994 |
| GB | 2314178 | 12/1997 |
| WO | 9112580 | 8/1991 |
| WO | 9706492 | 2/1997 |

OTHER PUBLICATIONS

Computer Record Accession No. 01210004 & PC Magazine, v6, n9, p. 263, Dec. 5, 1987.

* cited by examiner

*Primary Examiner*—Shahid Alam
*Assistant Examiner*—Jean Bolte Fleurantin
(74) *Attorney, Agent, or Firm*—Greer, Burns & Crain, Ltd.

(57) ABSTRACT

When multi-dimensional data for specifying search conditions is input, a plurality of combinations of the search conditions are automatically generated from the multi-dimensional data. Then, a plurality of search results for the plurality of combinations are obtained, and output as multi-dimensional data.

19 Claims, 27 Drawing Sheets

SEARCH RESULT OUTPUT SCREEN 5

4 documets were found.

```
DocID Title
   3  History of Marunouchi-line
  14  Subway paradise
 243  Travelling Tokyo
1321  Joy of Subway
```

RELATED WORD OUTPUT SCREEN 6

List of related words

- Marunouch-line
- Ginza-line
- Rail
- Ticket
- Sarin

SEARCH CONDITION INPUT SCREEN 3

Keywords  [TOKYO AND SUBWAY]  [Search] 4

DATE [1995/10/21] ~ [1996/6/1]

Database
- ☐ DB 1
- ☑ DB 2
- ☐ DB 3

F I G. 1 B
PRIOR ART

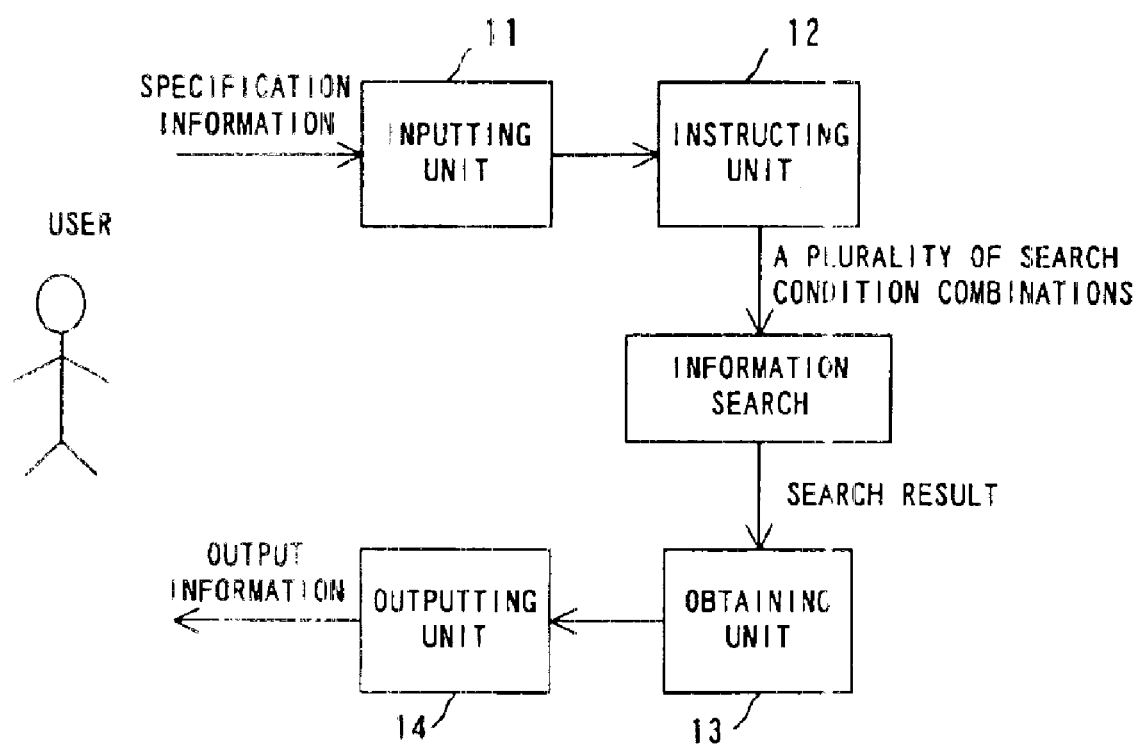
F I G. 2A

| Database |  | Patent-DB |  |  |  | Newspaper-DB |  |  |  |
|---|---|---|---|---|---|---|---|---|---|
| Keyword |  | Fujitsu |  | I-Company |  | Fujitsu |  | I-Company |  |
| Keyword | | Parallel | WWW | Parallel | WWW | Parallel | WWW | Parallel | WWW |
| Year | 1992 | 3 | 1 | 5 | 8 | 1 | 1 | 2 | 3 |
| | 1993 | 5 | 4 | 5 | 12 | 3 | 2 | 5 | 4 |
| | 1994 | 10 | 6 | 12 | 14 | 7 | 4 | 8 | 12 |
| | 1995 | 20 | 8 | 28 | 15 | 8 | 7 | 14 | 13 |
| | 1996 | 34 | 12 | 40 | 21 | 12 | 12 | 23 | 16 |
| | 1997 | 12 | 13 | 23 | 25 | 7 | 21 | 16 | 20 |
| | 1998 | 4 | 27 | 12 | 34 | 5 | 35 | 12 | 36 |

52

● Total Hit Number 53
○ Related Words
○ Hit Documents List 54
55
56

[Search] 53
[Graph] 57

FIG. 5

| Database | Patent-DB | | | | | | Newspaper-DB | | | | | |
|---|---|---|---|---|---|---|---|---|---|---|---|---|
| Keyword | Fujitsu | | I-Company | | | | Fujitsu | | I-Company | | | |
| Keyword | Parallel | WWW | Parallel | WWW | | | Parallel | WWW | Parallel | WWW | | |
| Year 1992 | Network | MAIL | Network | mail | | | CAP | MAIL | CPU | mail | | |
| 1993 | Network | MAIL | Network | mail | | | CAP256 | MAIL | CPU | mail | | |
| 1994 | Network | W3 | Network | Web | | | AP1000 | MAIL | CPU | internet | | |
| 1995 | Network | W3 | Network | Web | | | AP1000 | WEB | Network | Web | | |
| 1996 | Network | Web | Network | push | | | AP3000 | WEB | Network | Web | | |
| 1997 | SMP | push | Network | push | | | AP3000 | PORTAL | Network | portal | | |
| 1998 | SMP | push | Network | mobile | | | AP3000 | PORTAL | Network | portal | | |

○ Total Hit Number 54
● Related Words 55
○ Hit Documents List 56

[Search] 53

[Graph] 57

| Database | Patent-DB | | | | | | Newspaper-DB | | | | | |
|---|---|---|---|---|---|---|---|---|---|---|---|---|
| Keyword | Fujitsu | | I-Company | | | | Fujitsu | | I-Company | | | |
| Keyword Year | Parallel | WWW | Parallel | WWW | | | Parallel | WWW | Parallel | WWW | | |
| 1991 | 0 | 0 | 1 | 2 | | | 0 | 0 | 1 | 1 | | |
| 1993 | 5 | 4 | 5 | 12 | | | 3 | 2 | 5 | 4 | | |
| 1994 | 10 | 6 | 12 | 14 | | | 7 | 4 | 8 | 12 | | |
| 1995 | 20 | 8 | 28 | 15 | | | 8 | 7 | 14 | 13 | | |
| 1996 | 34 | 12 | 40 | 21 | | | 12 | 12 | 23 | 16 | | |
| 1997 | 12 | 13 | 23 | 25 | | | 7 | 21 | 16 | 20 | | |
| 1998 | 4 | 27 | 12 | 34 | | | 5 | 35 | 12 | 36 | | |

● 54 Total Hit Number   53 Search

○ 55 Related Words   51 Graph

○ 56 Hit Documents List

| SEARCH QUERY | NUMBER OF HITS | RELATED WORD | RESULT LIST |
|---|---|---|---|
| . . . | | | |
| . . . | | | |
| . . . | | | |
| . . . | | | |
| . . . | | | |
| . . . | | | |
| . . . | | | |
| | | | |

FIG. 20

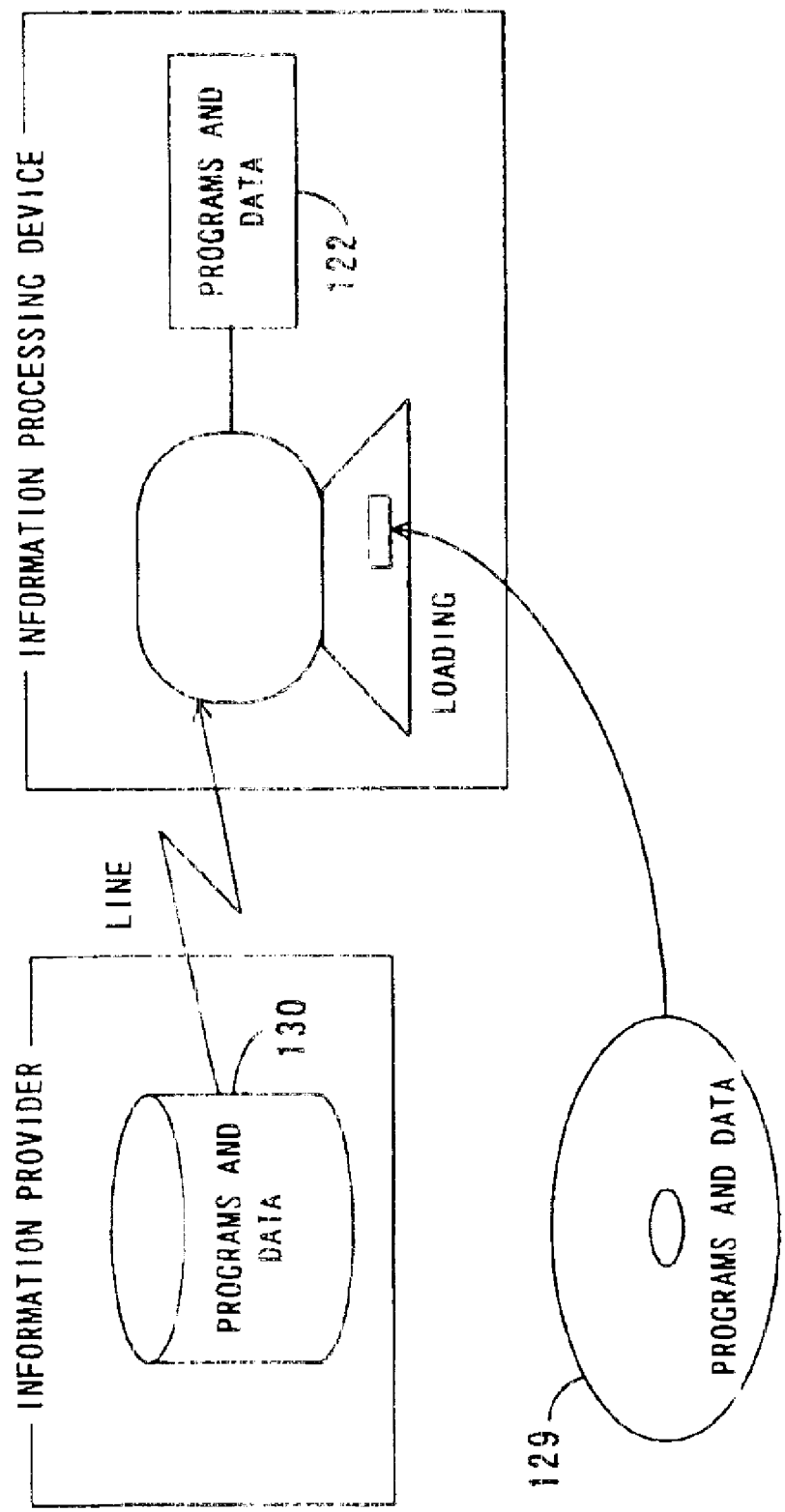
F I G. 25

SEARCH SYSTEM AND METHOD BASED ON SEARCH CONDITION COMBINATIONS

BACKGROUND OF THE INVENTION

1. Field of the Invention

The present invention relates to a search system for searching for the information of a document, etc. by combining a plurality of search conditions, and a method thereof.

2. Description of the Related Art

A full text search system is used to extract a text including a target keyword from a large volume of text data. Examples of application fields include an Internet search, a patent search, a document search by groupware, a document search in a library, etc.

The full text search system holds document information to be searched as a text database in a form referred to as an inverted index. When a search expression where a plurality of keywords are combined by a logical operator such as "AND" or "OR" is provided as an input, the number of documents and a list of (the names or the IDs of) the documents which satisfy the condition represented by the search expression, are returned as search results. P If keywords are combined by "AND", a document including both of the combined keywords is returned. If keywords are combined by "OR", a document including at least either of the keywords is returned. Additionally, a related word which frequently appears along with a keyword included in an input search expression can be returned depending on a system.

FIG. 1A shows such a full text search system. The system shown in FIG. 1A comprises a text database 1 and a full text search engine 2. Assuming that a search expression "TOKYO AND SUBWAY" is input, the search engine 2 searches the text database 1 for a document including both of the keywords "TOKYO" and "SUBWAY", and outputs a search result. Here, the number of hit documents, the IDs of the hit documents, and words related to the keywords are output.

FIG. 1B shows a typical user interface for inputs/outputs in the full text search system shown in FIG. 1A. On a search condition input screen 3, a database to be searched can be selected from three databases DB1, DB2, and DB3, and a search expression of keywords (Keywords) and duration to be searched (DATE) can be specified. The duration to be searched indicates the range of the dates written in documents.

In this example, DB2 is selected as a database to be searched, "TOKYO AND SUBWAY" is specified as a search expression, and the dates from Oct. 21, 1995 till Jun. 1, 1996 are specified as duration to be searched.

When a user presses (clicks with a pointing device) a Search button 4 after setting these search conditions, a search process starts to be executed. On a search result output screen 5, the number of documents found as a result of the search and the list of the documents are displayed. In this example, the finding of 4 documents, the list of the IDs of the documents (DocID), and their titles (Title) are displayed.

Furthermore, on a related word output screen 6, a list of keywords related to search conditions is displayed. In this example, keywords such as "Marunouchi-line", etc. are displayed as related words.

However, the above described conventional full text search system has the following problems.

With a conventional user interface, the number of search condition combinations that can be issued at one time is only one. If a search result change is desired to be examined by slightly changing respective search conditions, a search must be repeated the number of times, which is equal to the number of combinations of different search conditions.

For example, if a search is desired to be performed with the search expression "TOKYO AND SUBWAY" by dividing the duration from 1992 till 1998 in year units, a search must be repeated 7 times while changing the condition of the duration to be searched. Accordingly, a heavy workload of inputting the search conditions is imposed, which leads to system operability difficulties for the user.

Furthermore, since search results output for a plurality of search condition combinations are displayed for the respective combinations, it is difficult to arrange and compare the results. As a result, a search result change when a search condition is slightly changed cannot be recognized inclusively.

SUMMARY OF THE INVENTION

An object of the present invention is to provide a search system for realizing an improved user interface when search results are obtained for respective search condition combinations in an information search such as a full text search, etc.

In a first aspect of the present invention, a search system comprises an inputting unit and an instructing unit. The inputting unit inputs the specification information for collectively specifying a plurality of search condition combinations. The instructing unit instructs an information search based on the input specification information.

In a second aspect of the present invention, a search system comprises an obtaining unit and an outputting unit. The obtaining unit obtains a plurality of search results for a plurality of search condition combinations. The outputting unit collectively outputs the output information corresponding to the plurality of obtained search results.

In a third aspect of the present invention, a search system comprises an inputting unit, a searching unit, and an outputting unit. The inputting unit inputs the specification information for collectively specifying a plurality of search condition combinations. The searching unit performs an information search based on the specification information. The outputting unit collectively outputs the output information corresponding to a plurality of search results for the plurality of search condition combinations.

BRIEF DESCRIPTION OF THE DRAWINGS

FIG. 1B is a schematic showing a conventional user interface;

FIG. 2A is a block diagram showing the principle of a search system according to the present invention;

FIG. 5 shows a multi-dimensional output screen;

FIG. 6 shows a related word display;

FIG. 8 shows a search condition change;

FIG. 20 shows a search array;

FIG. 25 shows storage media.

DESCRIPTION OF THE PREFERRED EMBODIMENTS

Figure 1A:
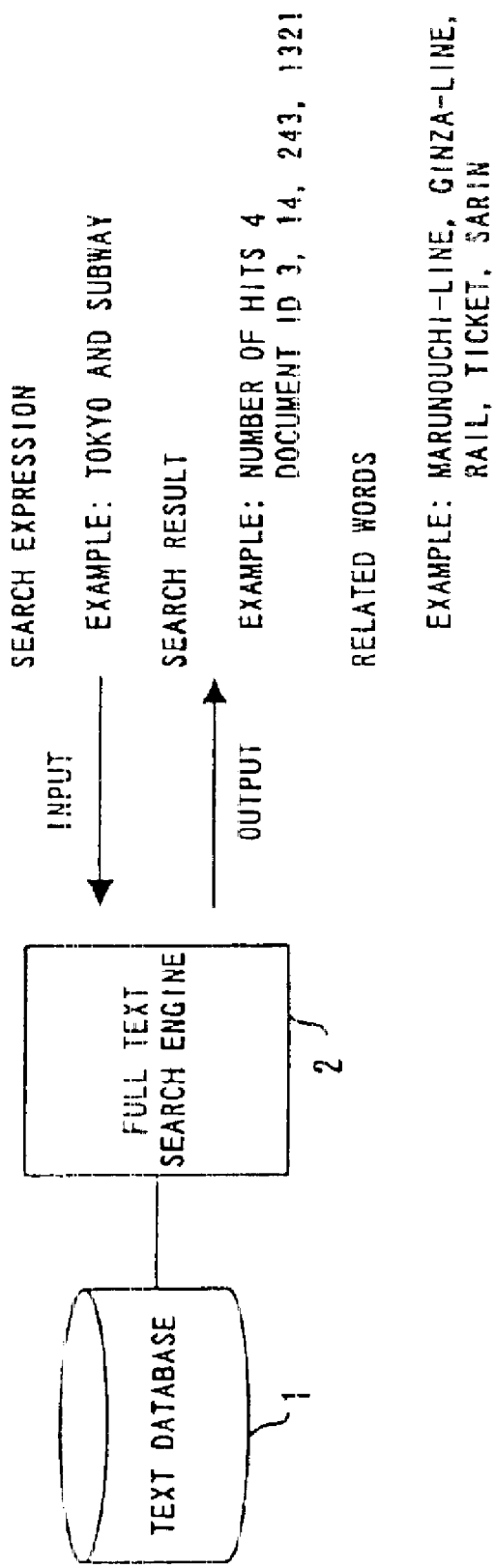
FIG. 1A is a schematic showing a conventional full text search system.

Details of preferred embodiments according to the present invention are explained below by referring to the drawings.

FIG. 2A is a block diagram showing the principle of a search system according to the present invention.

In the first aspect of the present invention, the search system comprises an inputting unit 11 and an instructing unit 12. The inputting unit 11 inputs the specification information for collectively specifying a plurality of search condition combinations. The instructing unit 12 instructs an information search based on the input specification information.

The instructing unit 12 instructs the information search specified by the specification information based on the specification information input by the inputting unit 11. As a result, the information search is automatically performed for a plurality of search condition combinations.

With such a search system, when a search is performed for various combinations of a plurality of search conditions such as a database to be searched, duration to be searched, a keyword, etc., a user can collectively input these combinations. Accordingly, an input interface easy to use for the user can be realized, which leads to an increase in an information search efficiency.

In the second aspect of the present invention, the search system comprises an obtaining unit 13 and an outputting unit 14. The obtaining unit 13 obtains a plurality of search results for a plurality of search condition combinations. The outputting unit 14 collectively outputs the output information corresponding to the plurality of obtained search results.

The outputting unit 14 generates output information from a plurality of search results obtained by the obtaining unit 13, and outputs the obtained output information. As a result, the information of a plurality of search results obtained by the search performed for a plurality of search condition combinations are automatically output.

With such a search system, a plurality of obtained search results are collectively output when a search is performed for various combinations of a plurality of search conditions, whereby a user can easily compare the plurality of search results. Accordingly, differences between search results can be inclusively recognized, so that an output interface easy to use for a user can be realized.

As described above, one point of the present invention is to collectively specify a plurality of search condition combinations, and another is to collectively output a plurality of search results for the plurality of search condition combinations.

Figure 2B:
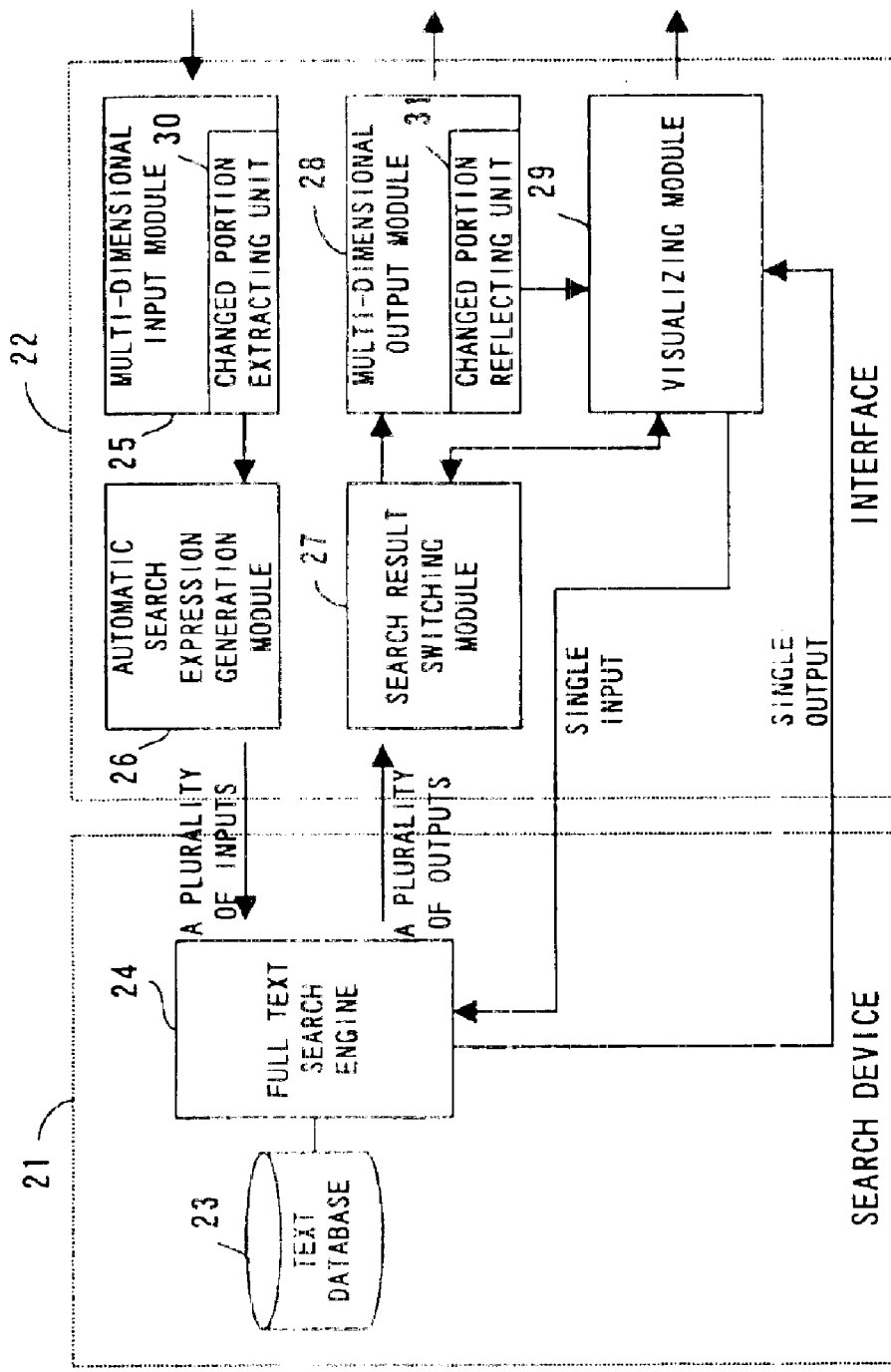
FIG. 2B is a block diagram showing the configuration of a full text search system.

For example, the inputting unit 11 shown in FIG. 2A corresponds to a multi-dimensional input module 25 which is shown in FIG. 2B and will be described later, the instructing unit 12 shown in FIG. 2A corresponds to an automatic search expression generation module shown in FIG. 26 shown in FIG. 2B, the obtaining unit 13 shown in FIG. 2A corresponds to a search result switching module 27 shown in FIG. 2B, and the outputting unit 14 shown in FIG. 2A corresponds to a multi-dimensional output module 28 and a visualizing module 29, which are shown in FIG. 2B.

FIG. 2B is a block diagram showing the configuration of a full text search system according to a preferred embodiment. The system shown in FIG. 2B comprises a search device 21 and an interface 22. The search device 21 corresponds to, for example, a conventional full text search system. This device comprises a text database 23 and a full text search engine 24.

The interface 22 comprises the multi-dimensional input module 25, the automatic search expression generation module 26, the search result switching module 27, the multi-dimensional output module 28, and the visualizing module 29.

The multi-dimensional input module 25 receives the information for specifying a plurality of search condition combinations from a user in a multi-dimensional data format, and inputs the received information to the automatic search expression generation module 26. The automatic search expression generation module 26 generates from the given information a plurality of search condition combinations (search expressions) that can be accepted by the search device 21, and sequentially provides the search device 21 with the generated combinations one by one. Upon receipt of each of the search expressions, the search engine 24 searches the text database 23 for each of them, and outputs a search result to the interface 22 for each.

The search result switching module 27 receives a plurality of search results from the search device 21, and selects necessary data as output information. The multi-dimensional output module 28 outputs the data selected by the search result switching module 27 in a multi-dimensional data format.

The visualizing module 29 visualizes and outputs a plurality of search results in the form of a graph. Additionally, the visualizing module 29 can also extract a particular search result specified by a user on the graph from the search result switching module 27, and can selectively output more detailed information. If the number of hit items of information is large and detailed information cannot be kept in the search result switching module 27, the particular search expression corresponding to the specified search result is again input to the search device 21. Then, the visualizing unit 29 receives a detailed search result from the search engine 24, and outputs the result.

The multi-dimensional input module 25 comprises a changed portion extracting unit 30. Accordingly, the multi-dimensional module 25 can also extract a changed portion of input multi-dimensional data, and can input the information of the extracted portion to the automatic search expression generation module 26. In this case, the automatic search expression generation module 26 automatically generates only a search expression including the changed condition, and provides the search device 21 with the generated search expression. In the meantime, the multi-dimensional output module 28 comprises a changed portion reflecting unit 31. This module reflects a search result based on a changed condition on already output information, and modifies the output information.

If the search device 21 corresponds to an independent full text search system, the configuration shown in FIG. 2B can be implemented by providing the interface 22 as a system externally attached to the search device 21. Furthermore, the search device 21 and the interface 22 are integrated into one system to be provided.

In a client-server system, the search device 21 and the interface 22 may be respectively arranged in a server and a client. In this case, the search device 21 and the interface 22 are interconnected via a communications network.

Next, specific examples of the processes performed by the system shown in FIG. 2B are explained by referring to FIGS. 3 through 15.

Figure 3:
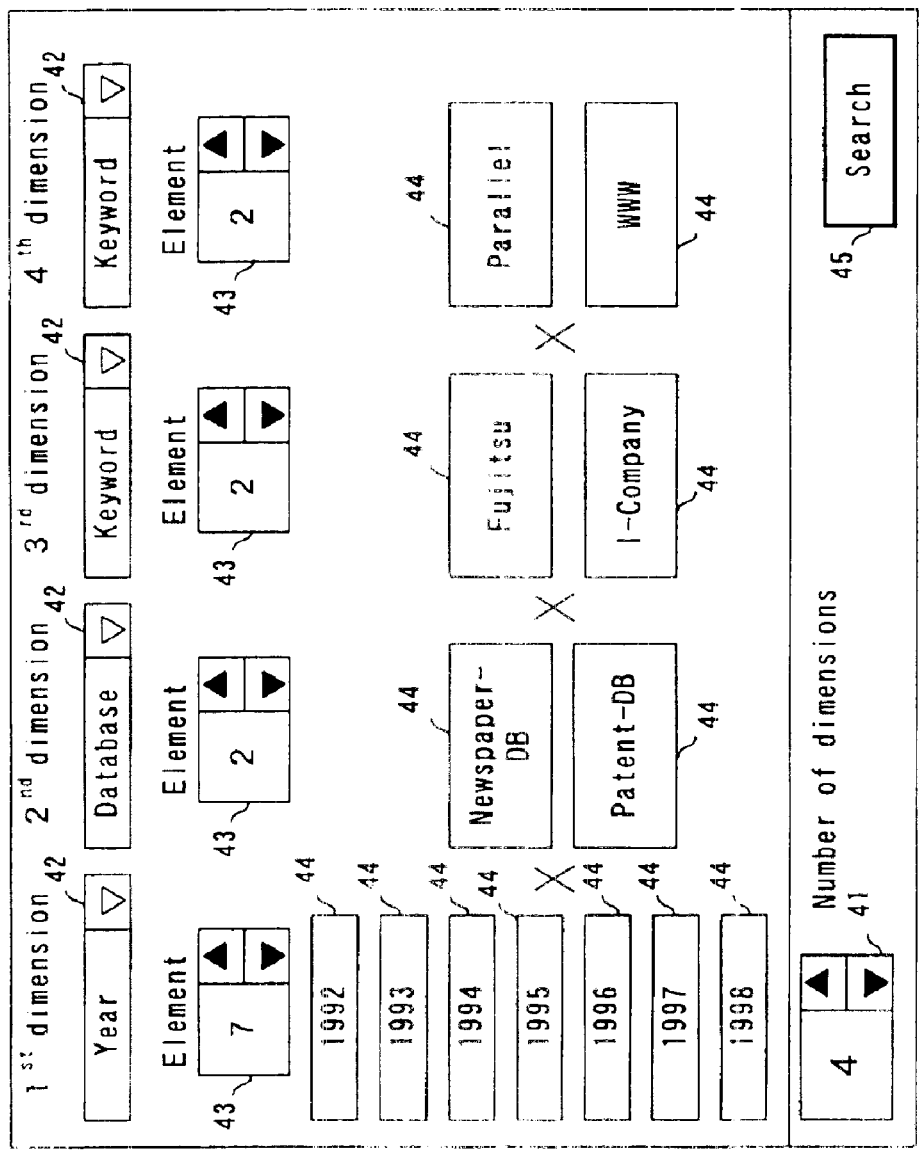
FIG. 3 shows a multi-dimensional input screen.

FIG. 3 exemplifies a multi-dimensional input screen that the multi-dimensional input module 25 generates on a display. Here, a dimension is set for each search condition type, and a plurality of elements can be set for each dimension. The plurality of elements are vertically arranged for each dimension, and "AND" is used to make a correspondence between dimensions. A user can specify necessary data from a menu, or may directly input necessary data.

First of all, when a user specify the number of dimensions used for a search in an input box 41, input boxes 42 and 43 corresponding to the specified number of dimensions are displayed. Here, "4" is specified as the number of dimensions, and respective 4 input boxes 42 and 43 are displayed in correspondence with the first through the fourth dimensions ("$1^{st}$ dimension", "$2^{nd}$ dimension", "$3^{rd}$ dimension", and "$4^{th}$ dimension").

Next, the condition type of each of the dimensions is defined in the input box 42, and the number of elements of the condition of each of the dimensions is specified in the input box 43, so that input boxes the number of which corresponds to the specified number of elements are displayed.

Here, "Year", "Database", "Keyword", and "Keyword" are specified as the condition types of the first through the fourth dimensions. "Year" indicates duration to be searched, "Database" indicates a database to be searched, and "Keyword" indicates a keyword included in a document.

Additionally, "7", "2", "2", and "2" are respectively specified as the numbers of elements in these dimensions. Accordingly, 7 input boxes 44 are displayed for the first dimension, and 2 input boxes 44 are respectively displayed for the second through the fourth dimensions.

At this time point, a user inputs the conditions corresponding to the respective dimensions to the input boxes 44. Here, seven conditions "1992" through "1998" are input to the input boxes 44 for the first dimension, two conditions "Newspaper-DB" and "Patent-DB" are input to the input boxes 44 for the second dimension, two conditions "Fujitsu" and "I-Company" are input to the input boxes 44 for the third dimension, and two conditions "Parallel" and "WWW" are input to the input boxes 44 for the fourth dimension.

When a user clicks a search button 45, a search is performed under the input search conditions for the respective dimensions. With such an input screen, it is possible to collectively instruct the issuance of search expressions of all combinations which are obtained by extracting the elements from the respective dimensions one by one. Accordingly, a user workload on the operations for inputting a plurality of search expressions can be reduced.

Figure 4:
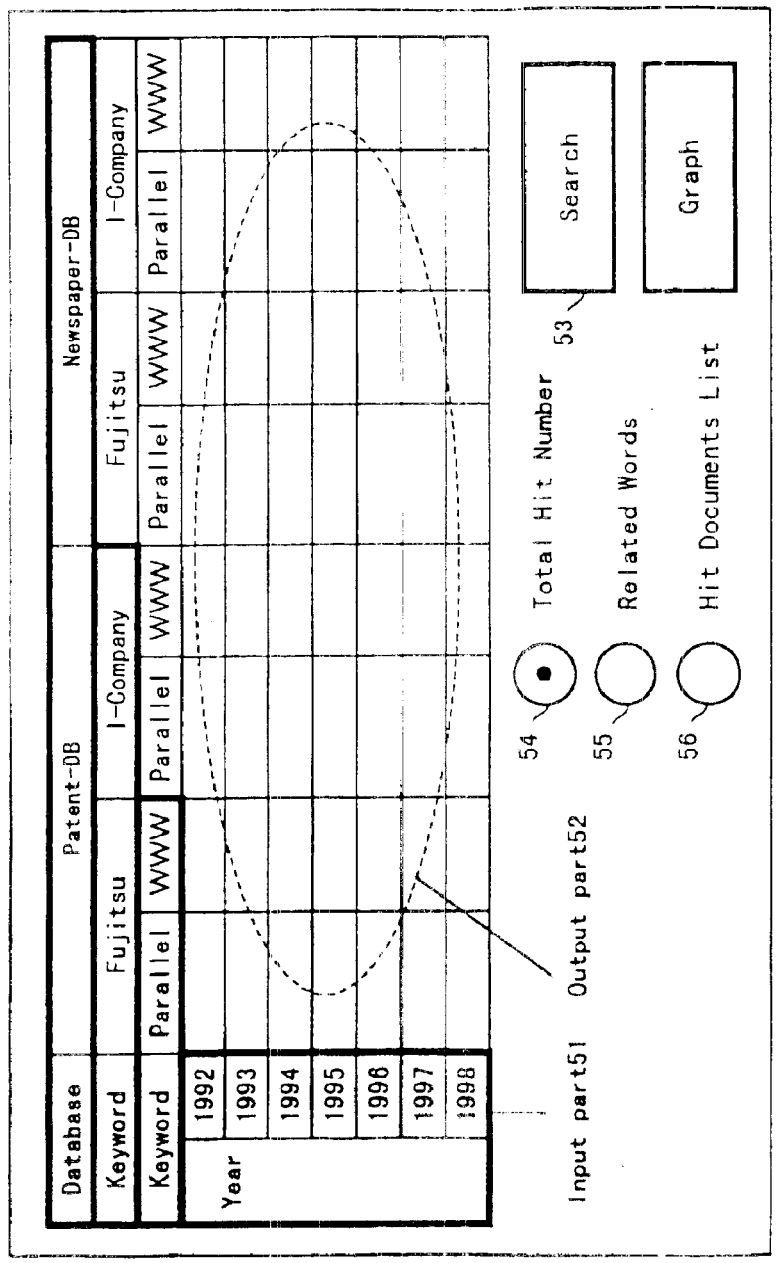
FIG. 4 shows an input/output screen in the form of a table.

FIG. 4 exemplifies an input screen of multi-dimensional data integrated with an output screen of search results. Here, a region ("Input part") 51 enclosed by a thick line is arranged in the upper left of the input/output screen in the form of a table, and search conditions are input to this region. In the remaining region ("Output part") 52, search results are displayed.

The condition types (such as "Database", "Keyword", "Year", etc.) assigned to the respective dimensions are set in the leftmost column, and one or more conditions are written to the columns at the right of the leftmost column. For the sake of representing multi-dimensional data on a two-dimensional plane, the same conditions are repeatedly displayed inside the table as shown in the upper two rows of "Keyword".

For example, "Fujitsu" and "I-Company" in the row of the first "Keyword" respectively appear twice in order to be respectively combined with "Patent-DB" and "Newspaper-DB". As a result, four combinations "Patent-DB" and "Fujitsu", "Patent-DB" and "I-Company"[1], "Newspaper-DB" and "Fujitsu", and "Newspaper-DB" and "I-Company" are set.

Additionally, "Parallel" and "WWW" in the row of the next "Keyword" respectively appear four times in order to be further combined with the above described four combinations external to these keywords. Note that, however, the conditions which are actually input by a user are only within the portions enclosed by thick lines, and the other repetition portions are automatically copied and displayed.

By user clicking the search button 53, a search is executed under the input search conditions of the respective dimensions. With such an input screen in the form of the table, a user can visually recognize the total number of search expressions specified with multi-dimensional data according to the size of the table, and can suitably increase/decrease the number of conditions based on the size of the table. Accordingly, the operations for inputting a plurality of search expressions can be made efficient.

When the multi-dimensional data is input by the multi-dimensional input module 25 in this way, the automatic search expression generation module 26 automatically generates search expressions the number of which is equivalent to the total number of round robin combinations of the elements in all the dimensions. Here, assuming that the number of dimensions is "n" and the number of elements of an "i"th dimension is "e(i)", the total number of generated search expressions is given by the following equation.

$$\text{NUMBER OF SEARCH EXPRESSIONS} = \prod_{i=1}^{n} e(i)$$

By way of example, for the multi-dimensional data shown in FIGS. 3 and 4, the number of search expressions= 7*2*2*2=56. Search expressions with the "Year" condition being "1992" are the following eight expressions.
1. (Year==1992) and (Database==Newspaper-DB) and (Keyword==Fujitsu) and (Keyword==Parallel)
2. (Year==1992) and (Database==Newspaper-DB) and (Keyword==Fujitsu) and (Keyword==WWW)

3. (Year==1992) and (Database==Newspaper-DB) and (Keyword==I-Company) and (Keyword==Parallel)
4. (Year==1992) and (Database==Newspaper-DB) and (Keyword==I-Company) and (Keyword-WWW)
5. (Year==1992) and (Database==Patent-DB) and (Keyword==Fujitsu) and (Keyword==Parallel)
6. (Year==1992) and (Database==Patent-DB) and (Keyword==Fujitsu) and (Keyword==WWW)
7. (Year==1992) and (database==Patent-DB) and (Keyword==i-Company and (Keyword==Parallel)
8. (Year==1992) and (Database==Patent-DB) and (Keyword==I-Company) and (Keyword==WWW)

Also the search expressions with the "Year" condition being "1993" through "1998" are similar. As described above, because the automatic search expression generation module 26 automatically generates a plurality of search expressions from multi-dimensional data, a user does not need to input the search expressions one by one, which leads to a reduction in a user workload.

Generated search expressions are sequentially provided to the search device 21, and the corresponding search results are sequentially returned to the interface 22. These search results normally include the information such as document IDs, etc., which are not required by the multi-dimensional output module 28. Accordingly, the search result switching module 27 extracts from the received search results the information of the number of hits, a related word, a search result list, etc., which are required by the multi-dimensional output module 28, and passes the extracted information to the multi-dimensional output module 28.

Whichever input method shown in FIG. 3 or 4 is used, the multi-dimensional output module 28 collectively outputs search results in the form of the table shown in FIG. 4, and displays the output information corresponding to each search expression in each cell in the region 52. Here, 56 cells are displayed in correspondence with 56 search expressions.

At this time, a user can switch between the displays of the number of hits ("Total Hit Number"), a related word ("Related Words"), and a search result list ("Hit Documents List") by clicking a selection button 54, 55, or 56. Accordingly, contents of the type selected by the user are displayed in the respective cells.

Figure 7:
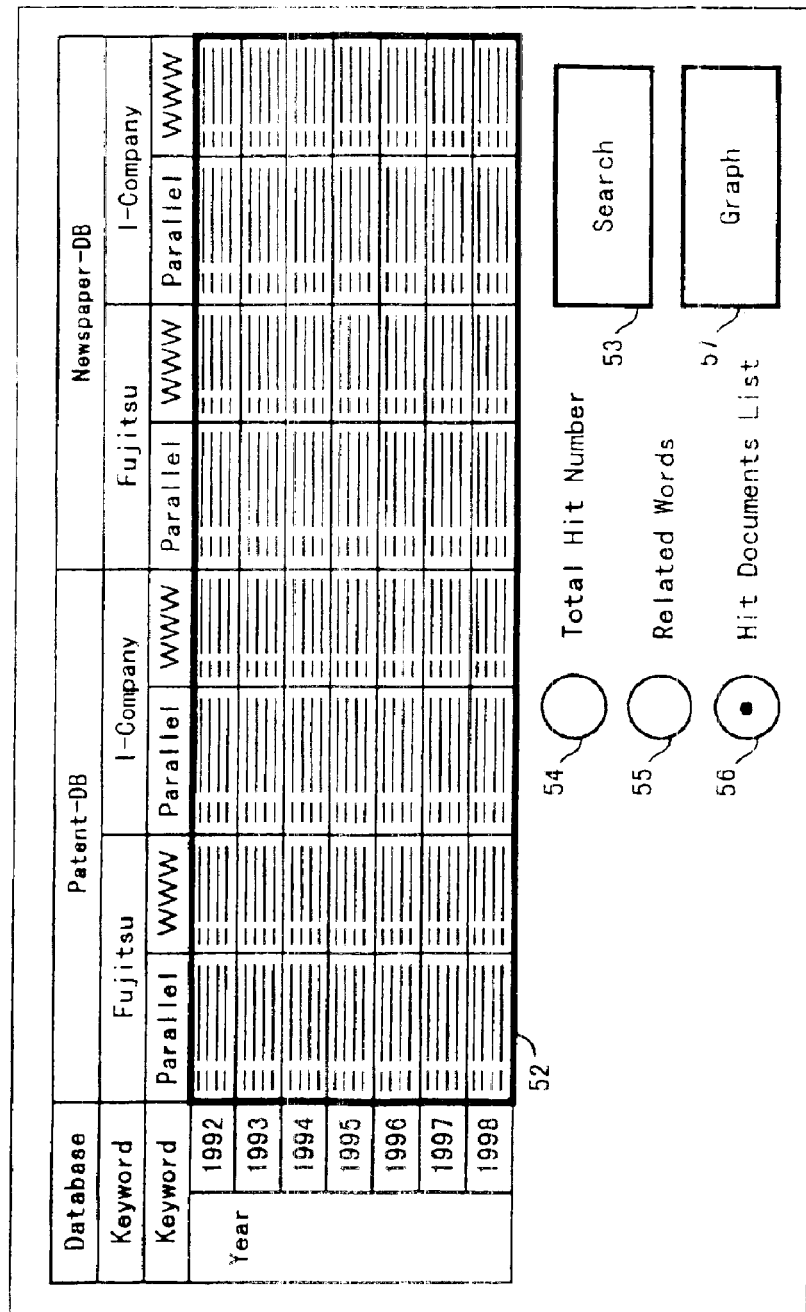
FIG. 7 shows a search result list display.

For example, if the selection button 54 is clicked and activated, the numbers of hits are displayed in the respective cells as shown in FIG. 5. When the selection button 55 is activated, related words are displayed in the respective cells as shown in FIG. 6. When the selection button 56 is activated, search result lists are displayed in the respective cells as shown in FIG. 7.

By collectively displaying search results based on a plurality of search expressions as described above, search result changes when search conditions are slightly changed can be inclusively recognized and the entire tendency of the search results can be grasped. Additionally, since the type of output information can be switched, the diversified tendency of search results can be grasped.

In the meantime, when a user changes a portion of a search condition of multi-dimensional data on the input screen shown in FIG. 3 or 4 or on the output screen shown in FIG. 5, 6, or 7, and again instructs a search, the interface 22 performs a search only for the changed portion and updates output information. On the output screen shown in FIG. 5, 6, or 7, a user changes a search condition and clicks the search button 53, so that a search is again performed.

First of all, the changed portion extracting unit 30 in the multi-dimensional input module 25 makes a comparison between the condition in each dimension in the previous search and that in the current search, and puts an input mark on a changed condition. The automatic search expression generation module 26 generates only the search expression corresponding to the difference between the multi-dimensional data in the previous and the current searches based on this mark.

For example, "1992" in the first dimension shown in FIG. 3 is changed to "1991", the following eight search expressions are generated.
1. (Year==1991) and (Database==Newspaper-DB) and (Keyword==Fujitsu) and (keyword==Parallel)
2. (Year==1991) and (Database==Newspaper-DB) and (Keyword==Fujitsu) and (Keyword==WWW)
3. (Year==1991) and (Database-=Newspaper-DB) and (Keyword==I-Company) and (Keyword==Parallel)
4. (Year==1991) and (Database==Newspaper-DB) and (Keyword==I-Company) and (Keyword==WWW)
5. (Year==1991) and (Database==Patent-DB) and (Keyword==Fujitsu) and (Keyword==Parallel)
6. (Year==1991) and (Database==Patent-DB) and (Keyword==Fujitsu) and (Keyword==WWW)
7. (Year==1991) and (database==Patent-DB) and (Keyword==I-Company) and (Keyword==Parallel)
8. (Year==1991) and (Database==Patent-DB) and (Keyword==I-Company) and (Keyword==WWW)

These search expressions are sequentially provided to the search device 21, and the corresponding search results are sequentially returned to the interface 22. The changed portion reflecting unit 31 in the multi-dimensional output module 28 updates the portion to which a change is made as output information as a result of the search corresponding to the difference between multi-dimensional data. At this time, the multi-dimensional output module 28 again outputs only the search result corresponding to the difference by using the information representing the presence/absence of the change, which is set by the multi-dimensional input module 25.

For example, if "1992" in the first dimension is changed to "1991" as described above, only the search results in the cells in the row of "1991", which are shown in FIG. 8 and enclosed by a thick line, are rewritten.

As described above, when a portion of a search condition represented by multi-dimensional data is changed, only a search for the changed portion is selectively executed and the corresponding output information is rewritten, so that the process is significantly made efficient compared with the case where a search is repeated for all of search conditions.

Additionally, if a user instructs a graph display on a search result output screen, the visualizing module 29 generates a graph which represents the number of hits from the search results of a multi-dimensional search.

Figure 9:
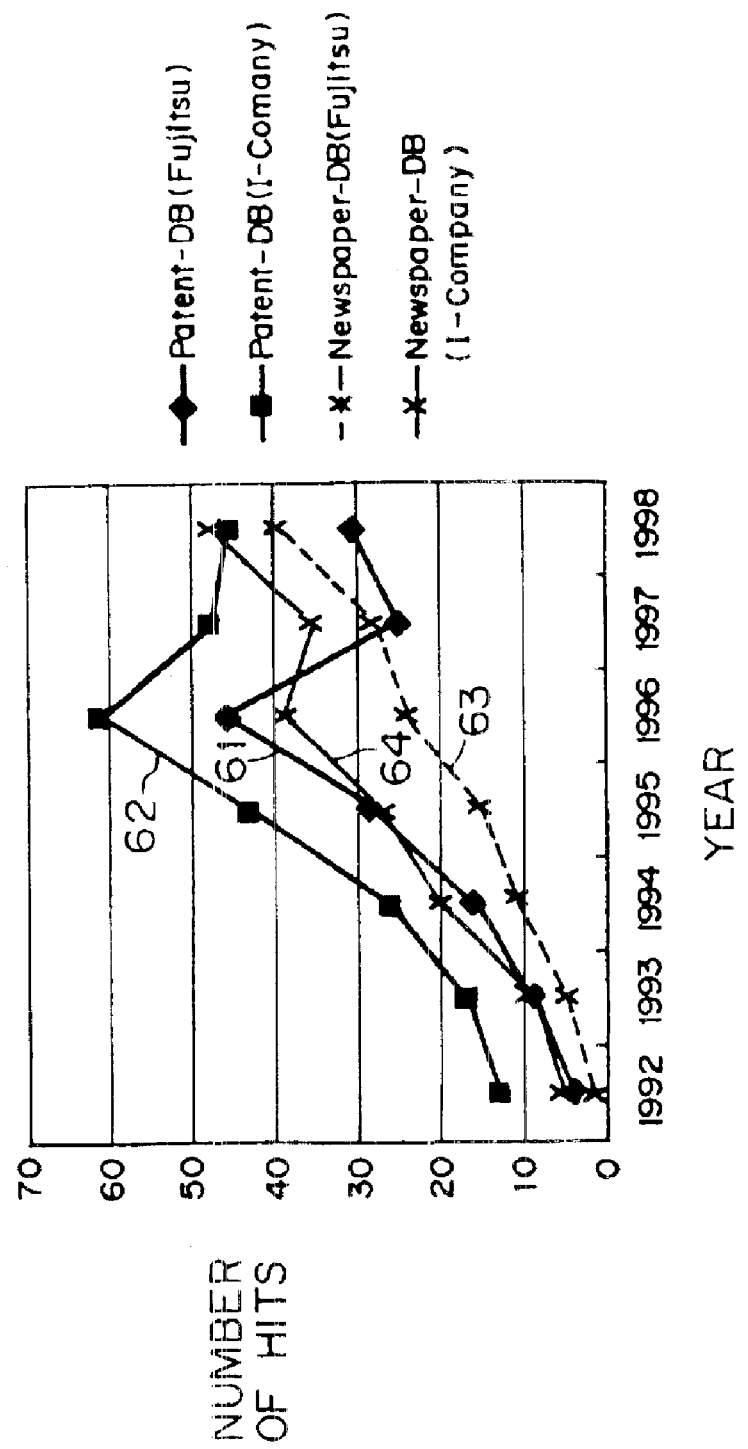
FIG. 9 shows a first line graph.

Suppose that a user clicks a graph button 57 on the output screen shown in FIG. 5, a line graph shown in FIG. 9 is displayed. The vertical axis of this graph represents the number of hits, while the horizontal axis represents the condition specified by a user. Here, "Year" is specified as the condition of the horizontal axis, and a line 61 represents the transition of the number of hits of each year, which corresponds to the combination classification of "(Database==Patent-DB) and (Keyword==Fujitsu)".

Furthermore, lines 62, 63, and 64 respectively correspond to the classifications such as "(Database==Patent-DB) and (keyword==I-Company)", "(Database==Newspaper-DB) and (Keyword==Fujitsu)", and "(Database==Newspaper-DB) and (Keyword==I-Company)".

Figure 10:
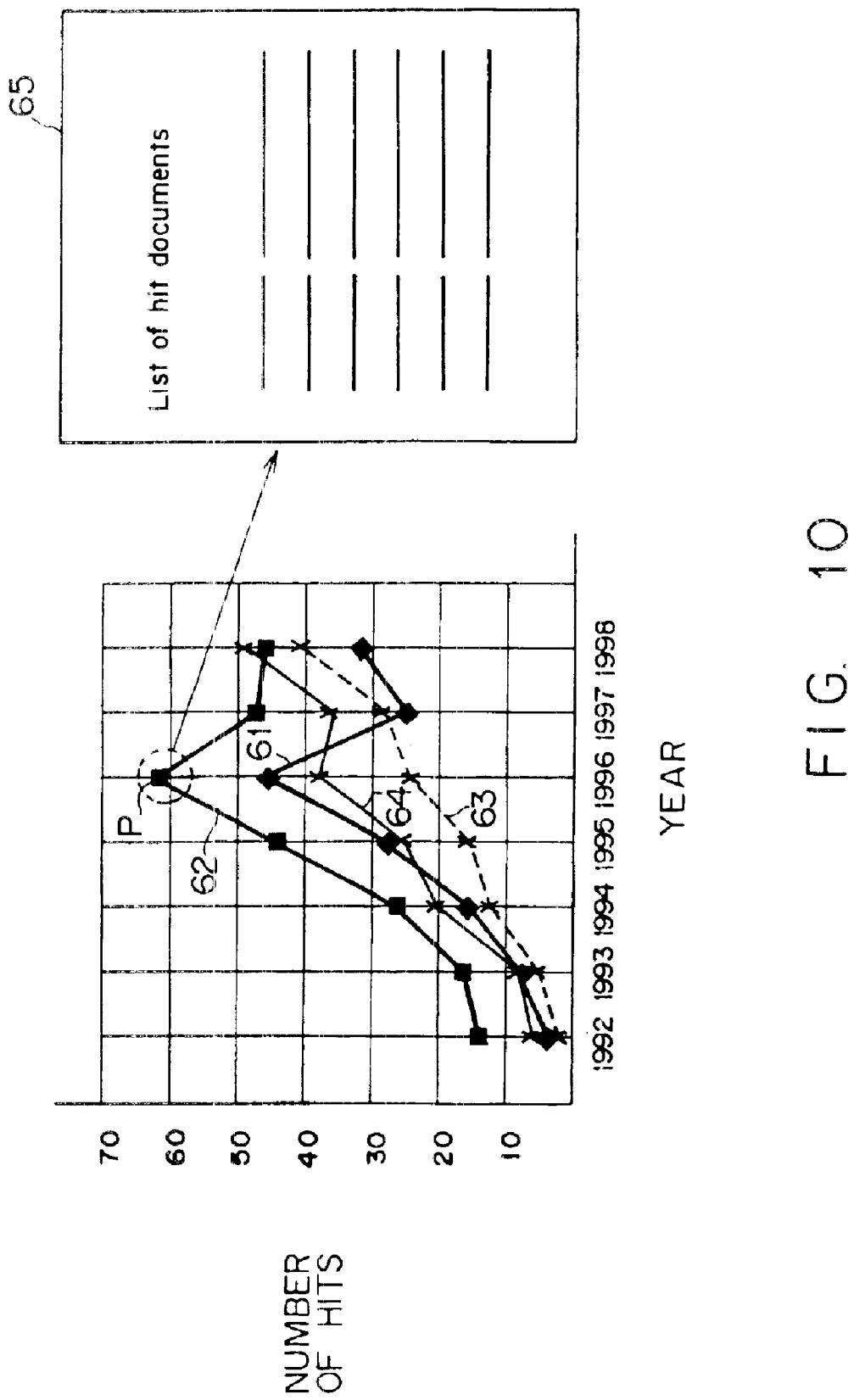
FIG. 10 shows a graph display and a list display.

Here, if a user specifies a portion of the displayed graph, the visualizing module 29 selectively displays as a list the search results corresponding to the specified portion. For example, in the line graph shown in FIG. 9, when a user clicks a point "P" (the number of hits=61), which corresponds to the year 1996 on the line 62, a search result list 65 including 61 hit documents is displayed as shown in FIG. 10. This search result list 65 includes the information such as the titles, the summaries, etc. of the hit documents.

If the search result list 65 is stored in the search result switching module 27 at this time, the visualizing module 29 extracts this list from the search result switching module 27, and outputs the list. Additionally, if the search result list 65 is not stored in the search result switching module 27, search expressions corresponding to the specified portion in the graph are selectively generated and input to the search device 21. Then, the visualizing module 29 receives the search result list 65 from the search engine 24, and outputs the list 65.

Furthermore, the visualizing module 29 can display various graphs shown in FIGS. 11 through 15 other than the line graph shown in FIG. 9. Also in these graphs, a user specifies a point or a region in the graphs, so that the search results corresponding to the specified portion are displayed as a list.

Figure 11:
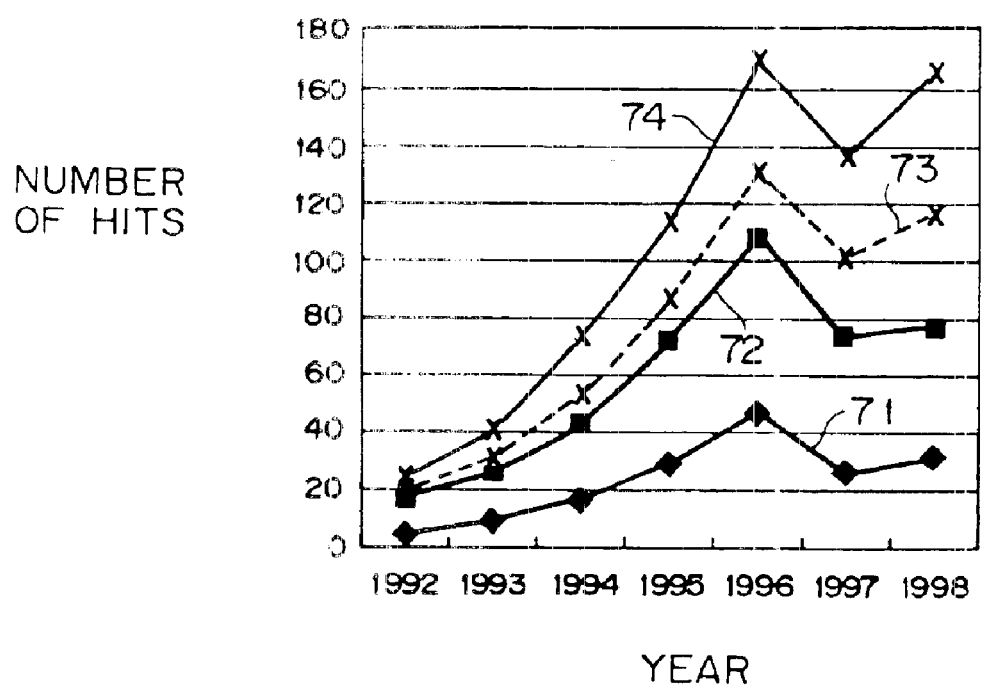
FIG. 11 shows a second line graph.

The line graph shown in FIG. 11 represents the transition of the total number of hits of each year shown in FIG. 5. A line 71 corresponds to the line 61 shown in FIG. 9, and a line 72 corresponds to the total of the numbers of hits of the lines 61 and 62 in FIG. 9. A line 73 corresponds to the total of the numbers of the lines 61, 62, and 63 in FIG. 9. A line 74 corresponds to the total of the numbers of hits of the lines 61, 62, 63, and 64 in FIG. 9.

Figure 12:
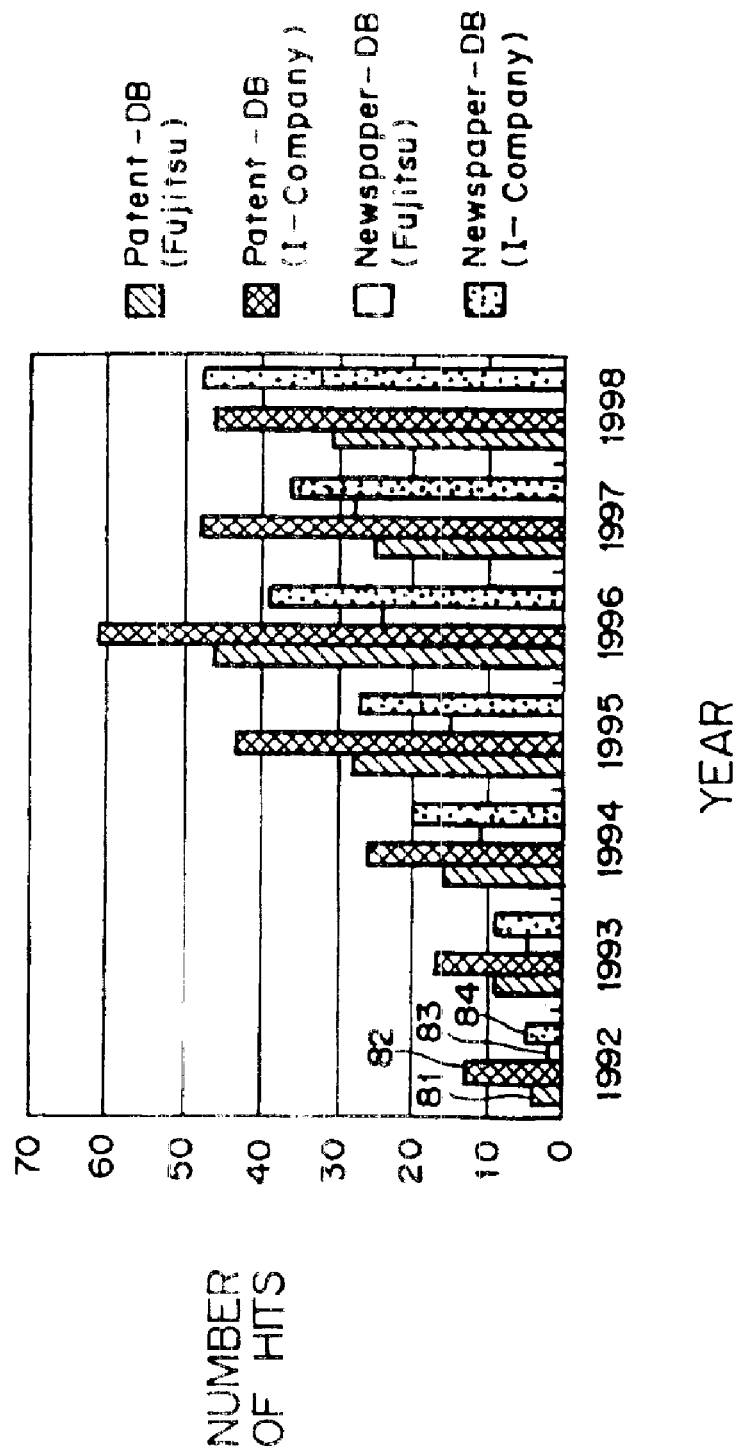
FIG. 12 shows a first bar chart.

A bar chart shown in FIG. 12 represents the transition of the number of hits of each year shown in FIG. 5. Bars 81, 82, 83, and 84 in FIG. 12 respectively correspond to the numbers of hits of the lines 61, 62, 63, and 64 in FIG. 9.

Figure 13:
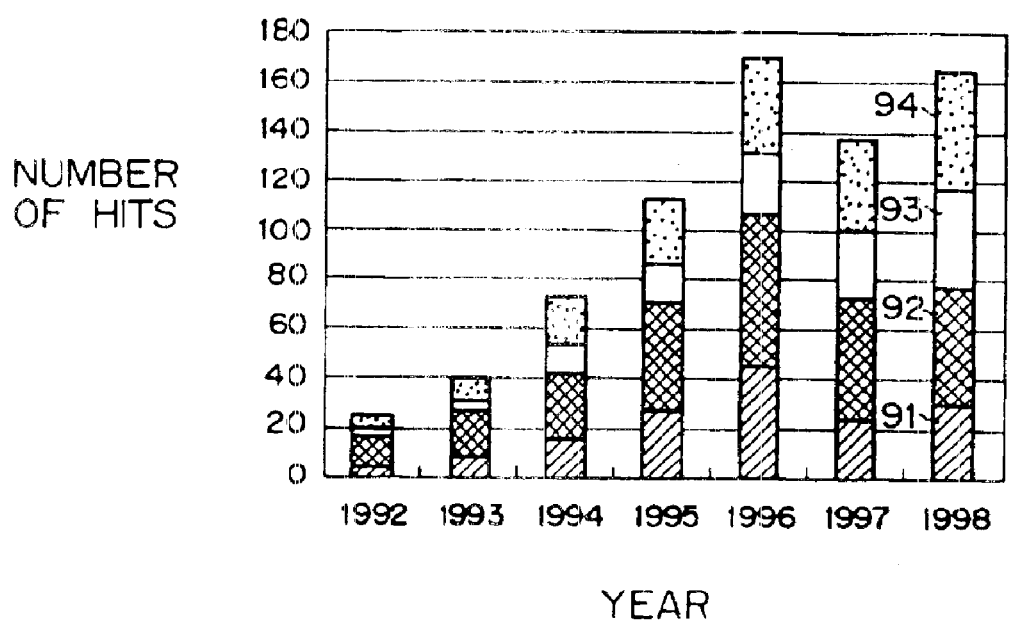
FIG. 13 shows a second bar chart.

A bar chart shown in FIG. 13 represents the transition of the total number of hits of each year in FIG. 5. The bar chart shown in FIG. 13 corresponds to the line 74 in FIG. 11. Rectangles 91, 92, 93, and 94 within each bar respectively correspond to the numbers of hits in the lines 61, 62, 63, and 64 in FIG. 9.

Figure 14:
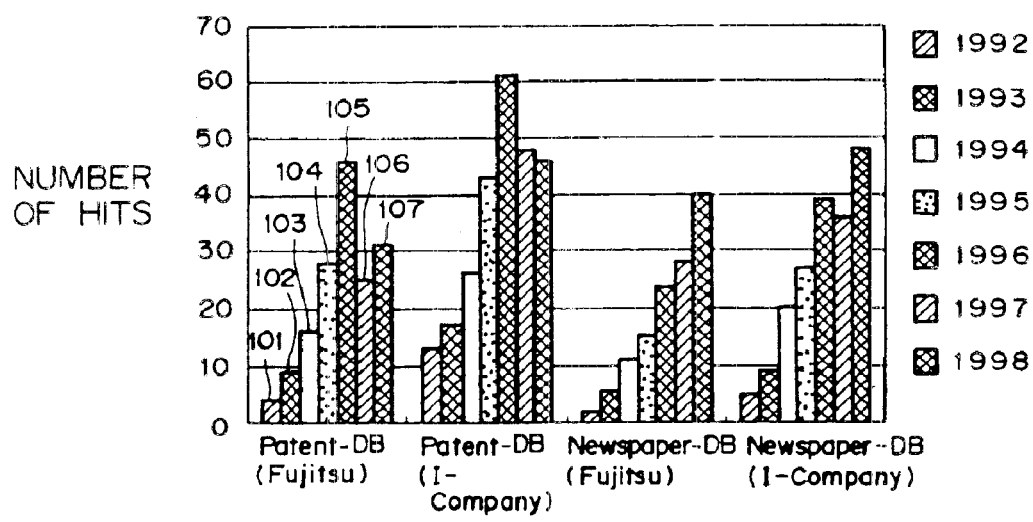
FIG. 14 shows a third bar chart.

A bar chart shown in FIG. 14 represents the transition of the number of hits in each of the classifications in FIG. 5.

Here, the transition of the number of hits of each year is shown for each of the four classifications corresponding to the four lines in FIG. 9. Each of bars 101, 102, 103, 104, 105, 106, and 107 within the respective classifications corresponds to one point on one line in FIG. 9.

Figure 15:
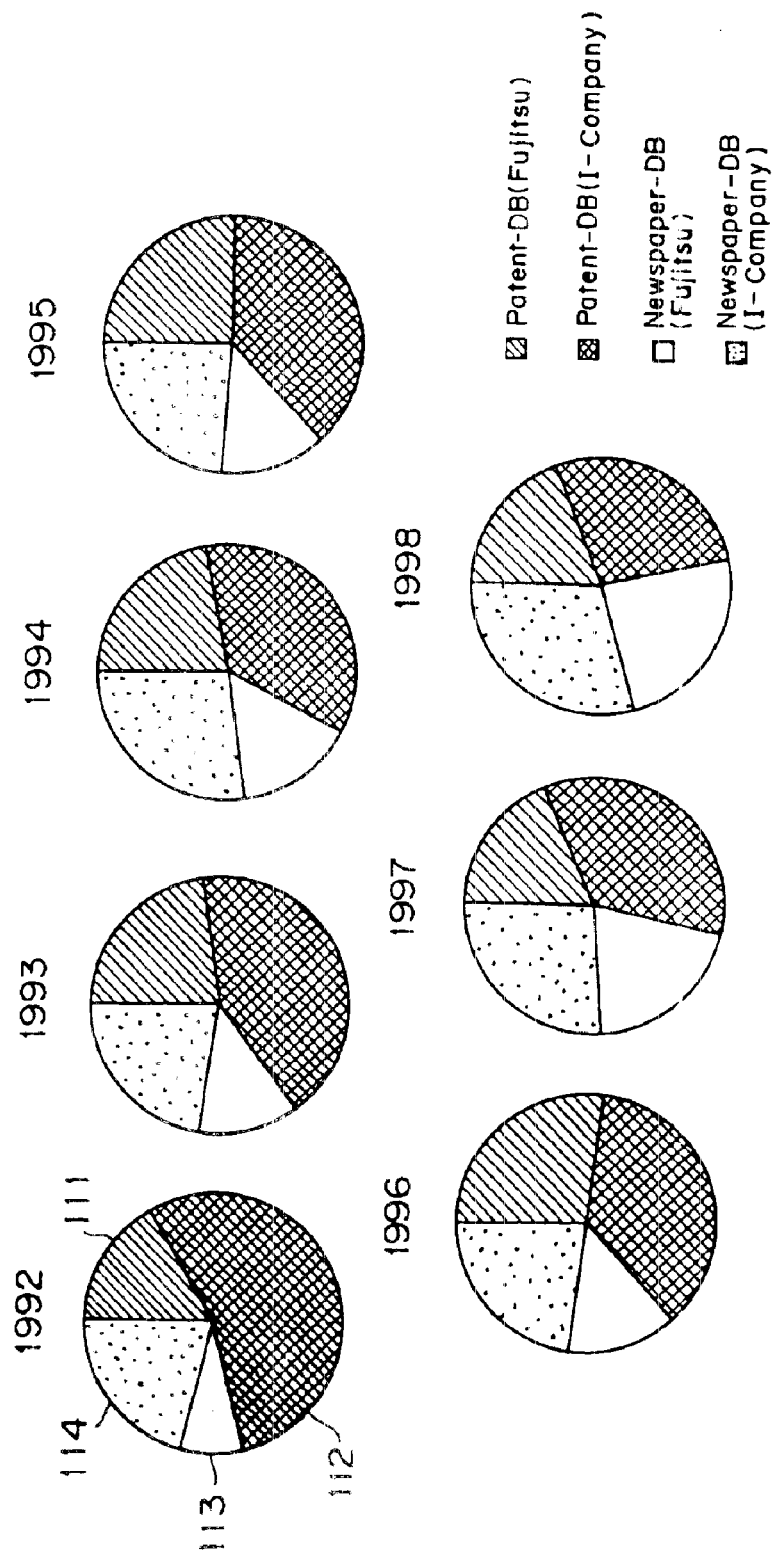
FIG. 15 shows pie charts.

Pie charts shown in FIG. 15 represent the transition of the percentage of the number of hits of each year in FIG. 5. In each of the pie charts shown in FIG. 15, sectors 111, 112, 113, and 114 respectively correspond to the bars 81, 82, 83, and 84 in FIG. 12.

By automatically displaying the number of hits as a graph as described above, the overall tendency of search results can be visually grasped. Additionally, since the search results corresponding to the portion specified by a user are automatically displayed as a list, the user can obtain locally detailed information while viewing the graph.

Next, details of the processes performed by the respective modules shown in FIG. 2B are explained by referring to FIGS. 16 through 22.

Figure 16:
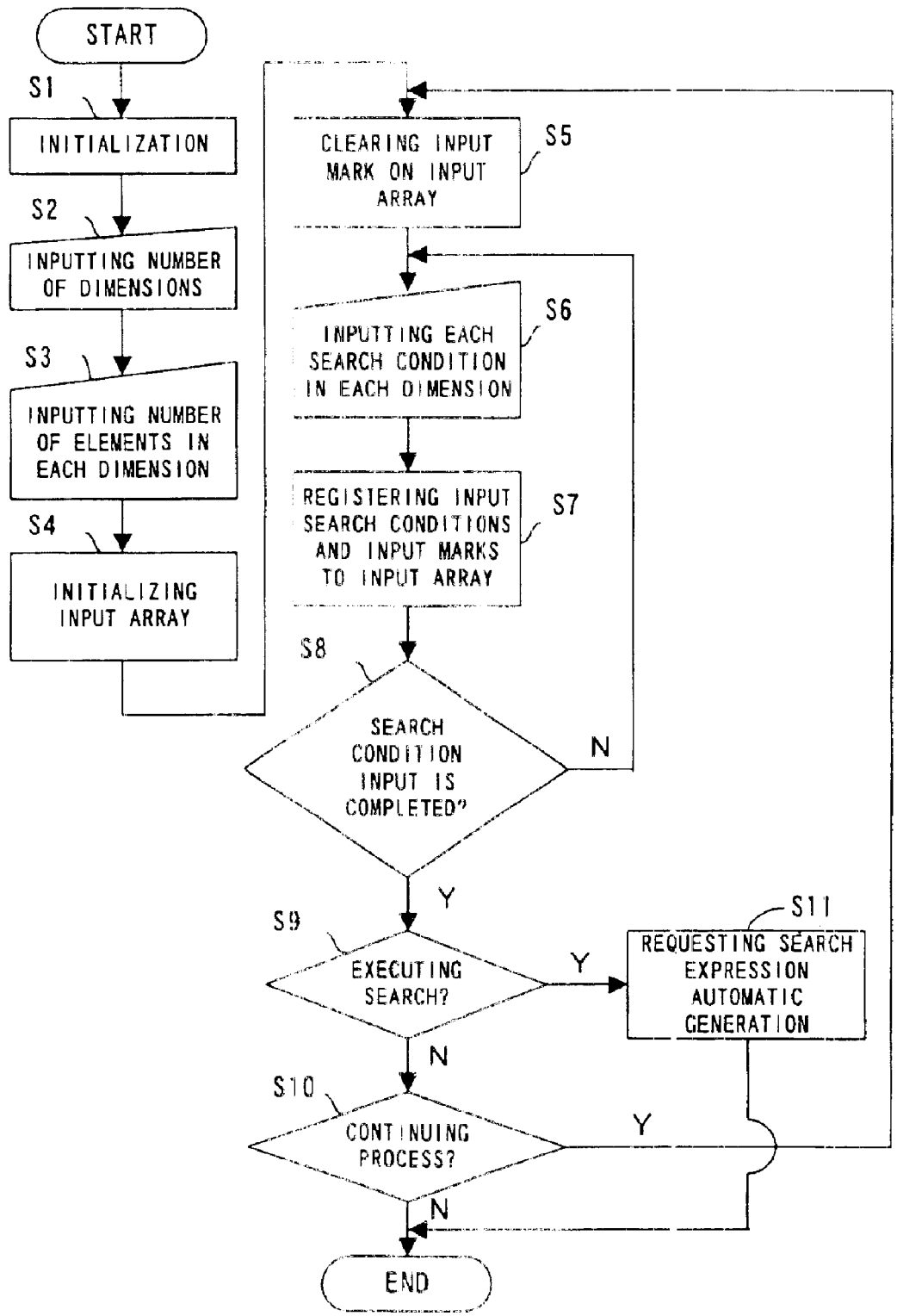
FIG. 16 is a flowchart showing the process performed by a multi-dimensional input module.

FIG. 16 is a flowchart showing the process performed by the multi-dimensional input module 25. The multi-dimensional input module 25 first initializes an input screen (step S1), inputs a specified number of dimensions (step S2), inputs the number of elements in each of the specified dimensions (step S3), and initializes an input array representing multi-dimensional data (step S4).

Figure 17:
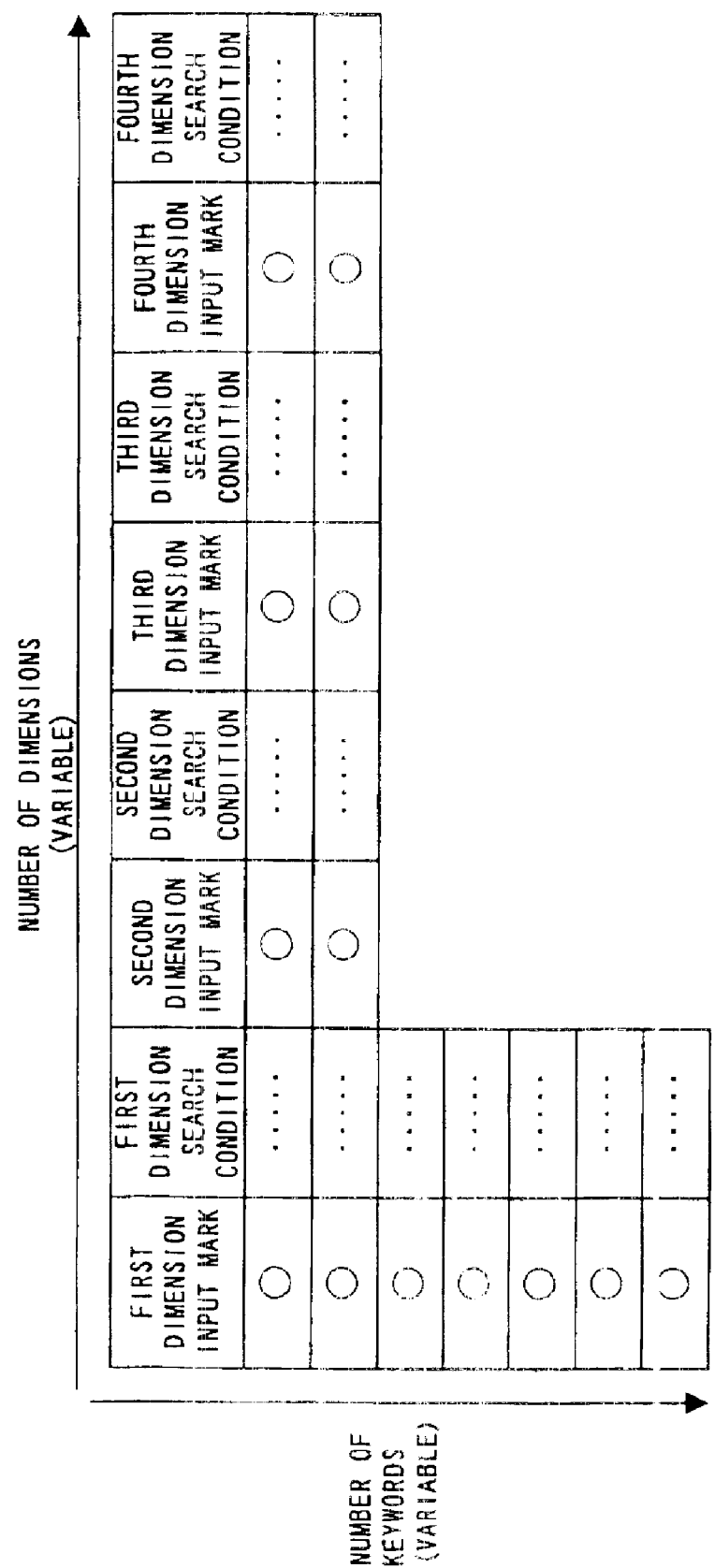
FIG. 17 shows a first input array.

Assuming that the number of dimensions is "4", the number of elements in the first dimension is "7", and the numbers of elements in the second through the fourth dimensions are "2" as shown in FIG. 3, an input array shown in FIG. 17 is generated. The length and the width of this input array are variable. The width corresponds to the double of the number of dimensions, while the length corresponds to the number of elements in each dimension. Furthermore, if a portion of multi-dimensional data is changed and a search is again performed, the input array of the multi-dimensional data is used unchanged.

Next, the multi-dimensional input module 25 sets all of search conditions to the state where no change is made by clearing an input mark on the input array (step S5), inputs the respective search conditions in the respective dimensions (step S6), and registers the input search conditions to the input array (step S7). At this time, the changed portion extracting unit 30 puts input marks on the registered search conditions, and sets them to the state where a change is made.

Next, the multi-dimensional input module 25 determines whether or not the input of the search conditions is completed (step SB). If the input is not completed, the multi-dimensional input module 25 repeats the operations in and after step S6. For example, if a user inputs the next search condition, the input of the search conditions is determined not to be completed.

Figure 18:
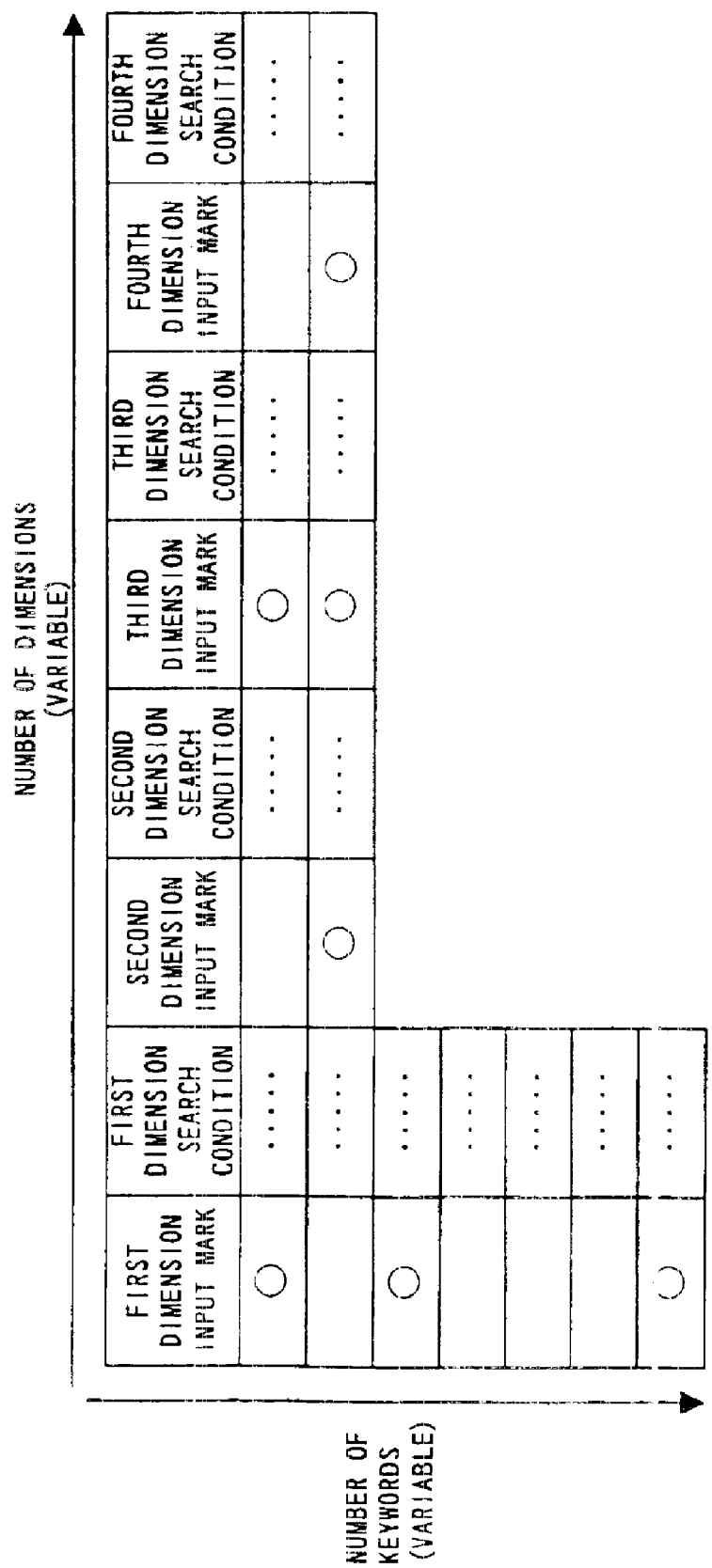
FIG. 18 shows a second input array.

With such a process, when all of search conditions in an input array are newly input, input marks are put on all of the search conditions as shown in FIG. 17. If only some of the search conditions are newly input, input marks are put only on the input search conditions as shown in FIG. 18.

Upon completion of the input, the multi-dimensional input module 25 then determines whether or not search execution is instructed (step S9). If the instruction is not issued, the multi-dimensional input module 25 further determines whether or not to continue the input process (step S10). If the multi-dimensional input module 25 determines to continue the input process, it repeats the operations in and after step S5. If the multi-dimensional input module 25 determines not to continue the input process, it terminates the process. Whether or not to continue the input process is determined, for example, based on the instruction from the user.

If the search execution is instructed in step S9, the multi-dimensional input module 25 passes the information of the input array to the automatic search expression generation module 26, requests the automatic generation of a search expression (step S11), and terminates the process.

Figure 19:
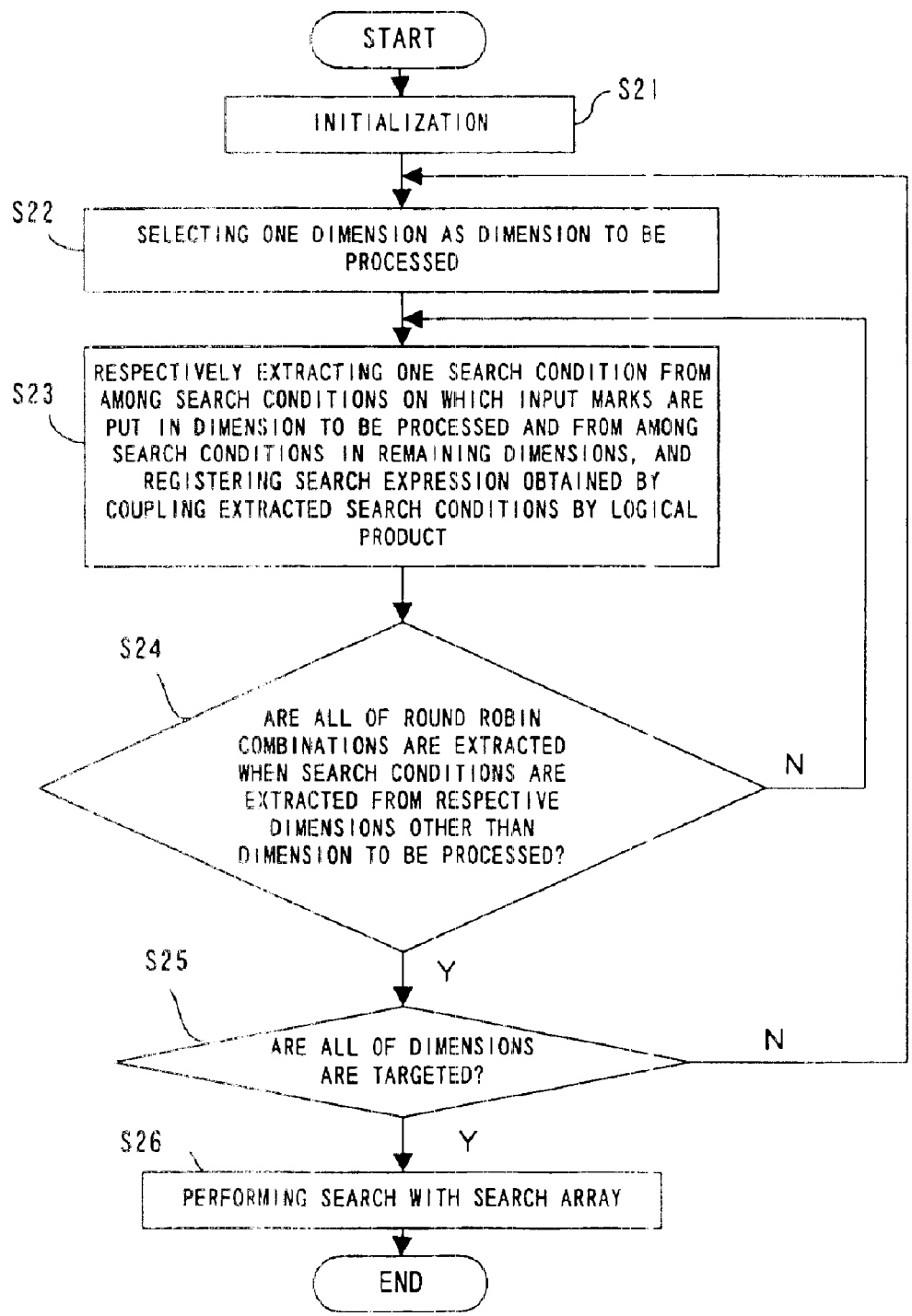
FIG. 19 is a flowchart showing the process performed by an automatic search expression generation module.

FIG. 19 is a flowchart showing the process performed by the automatic search expression generation module 26. The automatic search expression generation module 26 initializes the module itself (step S21), and selects one of the dimensions of the input array as a dimension to be processed (step S22).

Next, the automatic search expression generation module 26 generates a search expression by extracting one search condition for each dimension from among search conditions on which input marks are put in the dimension to be processed and from among all the search conditions in the remaining dimensions, and by coupling the extracted search conditions by "AND". Then, the automatic search expression generation module 26 registers the generated search expression to a search array shown in FIG. 20 as a search query (step S23).

Then, the automatic search expression generation module 26 checks whether or not all of round robin combinations have been extracted when a search condition is extracted from each of the dimensions other than the dimension to be processed (step S24). If all of the combinations have not been extracted yet, the automatic search expression generation module 26 repeats the operations in and after step S23. If all of the combinations have been extracted, the automatic search expression generation module 26 checks whether or not all of the dimensions have been selected as a dimension to be processed (step S25).

If a dimension yet to be selected is left, the automatic search expression generation module 26 repeats the operations in and after step S22. If all of the dimensions have been selected as a dimension to be processed, the automatic search expression generation module 26 provides the search engine 24 with the search queries registered to the search array one by one, requests search execution (step S26), and terminates the process.

Figure 21:
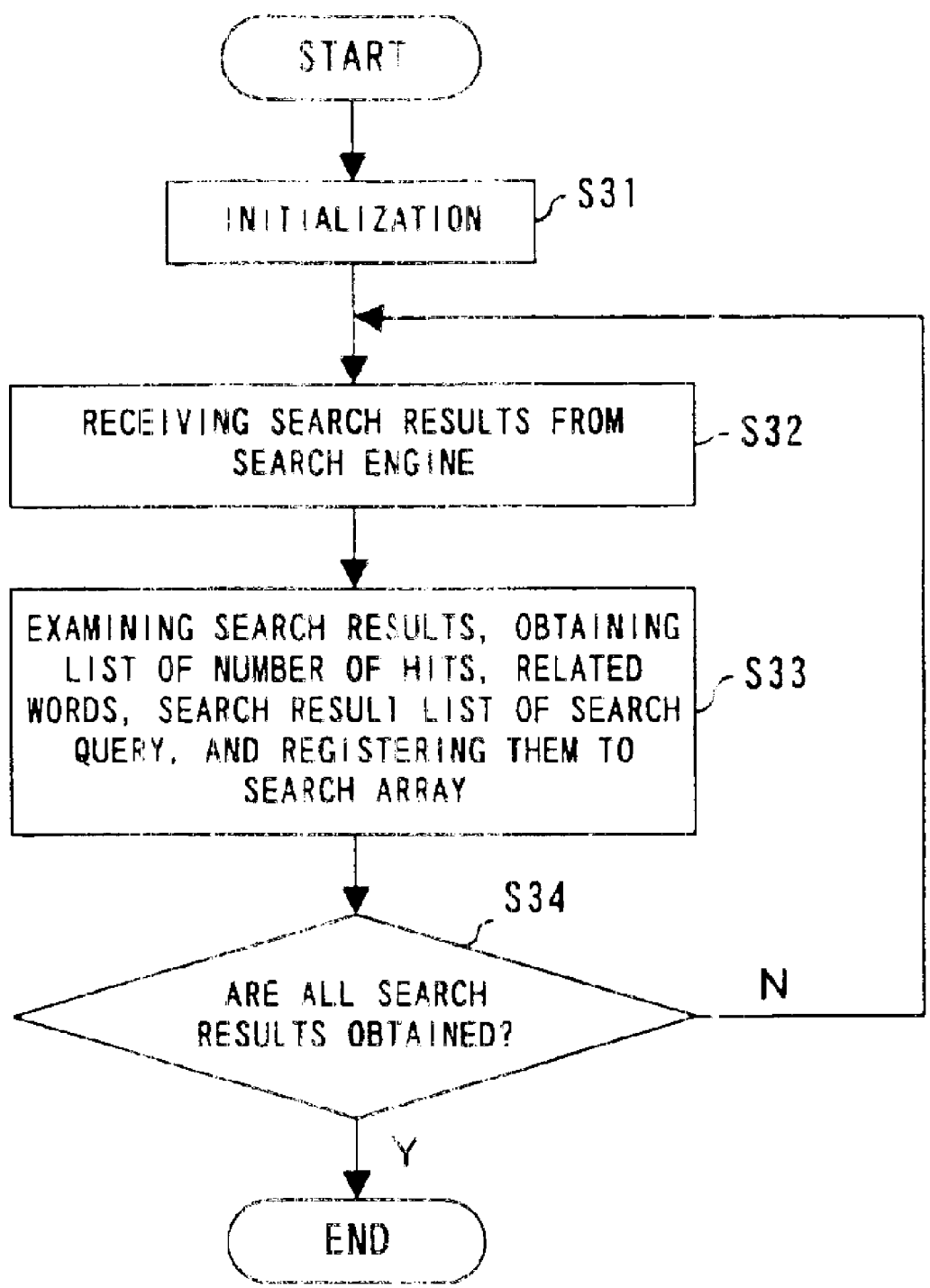
FIG. 21 is a flowchart showing the process performed by a search result switching module.

FIG. 21 is a flowchart showing the process performed by the search result switching module 27. The search result switching module 27 first initializes the module itself (step S31), and receives search results from the search engine 24 (step S32). Next, the search result switching module 24 examines the received search results, obtains the number of hits, related words, and search result lists, which correspond to a search query, and registers them to a search array (step S33).

Then, the search result switching module 27 checks whether or not the search results corresponding to all of search queries are obtained (step S34). If a search result yet to be obtained is left, the search result switching module 27 repeats the operations in and after step S32. If all of the search results are obtained, the search result switching module 27 terminates the process. Then, the information of the search array is passed to the multi-dimensional output module 28 or the visualizing module 29.

Figure 22:
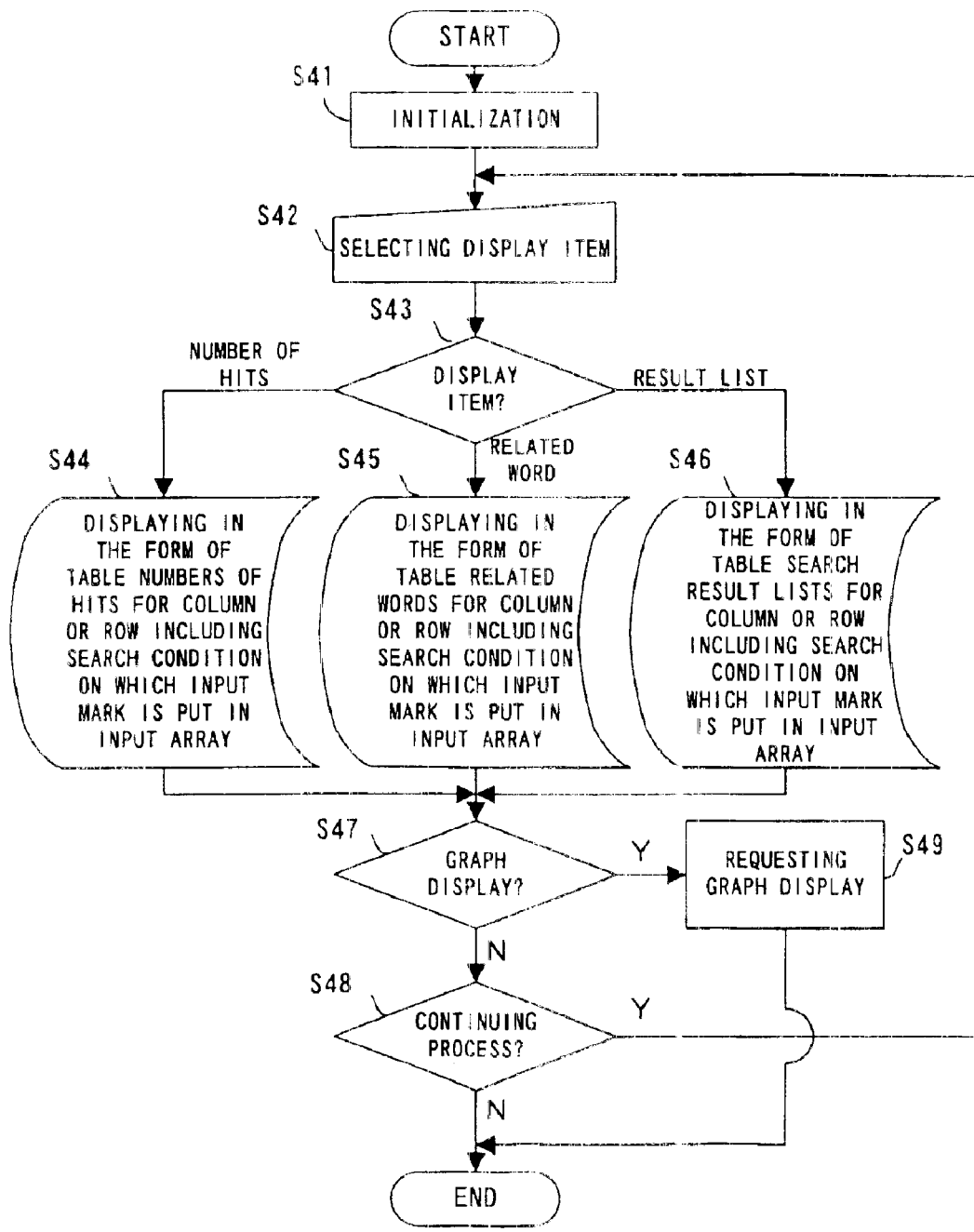
FIG. 22 is a flowchart showing the process performed by a multi-dimensional output module.

FIG. 22 is a flowchart showing the process performed by the multi-dimensional output module 28. The multi-dimensional output module 28 first initializes an output screen (step S41), inputs the display item selected by a user (step S42), and determines which of the number of hits, a related word, and a search result list the display item is (step S43).

If the display item is the number of hits, the multi-dimensional output module 28 displays the number of hits in each cell in the column or the row, which corresponds to a search condition on which an input mark is put in an input array, in the table on the output screen (step S44). If the display item is a related word, the multi-dimensional output module 28 displays a related word in each cell (step S45). If the display item is a search result list, the multi-dimensional output module 28 displays a result list in each cell (step S46).

Next, the multi-dimensional output module 28 determines whether or not a graph display is instructed (step S47). If the graph display is not instructed, the multi-dimensional output module 28 determines whether or not to continue the output process (step S48). If the multi-dimensional output module 28 determines to continue the output process, it repeats the operations in and after step S42. If the multi-dimensional output module 28 determines not to continue the output process, it terminates the process. Whether or not to continue the output process is determined, for example, based on the instruction from the user.

If the graph display is instructed in step S47, the multi-dimensional output module 28 requests the visualizing module 29 to perform the graph display (step S49), and terminates the process.

Figure 23:
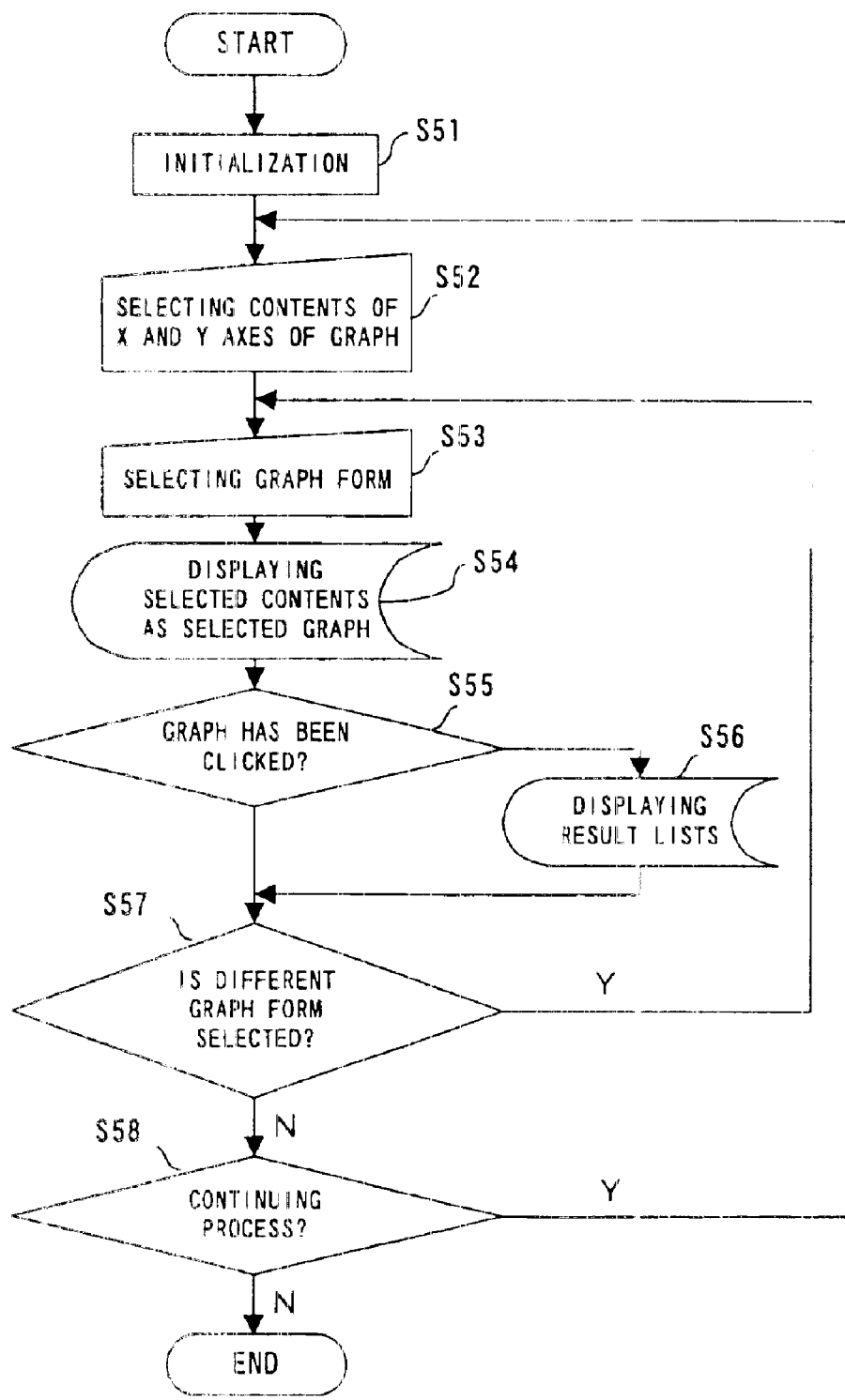
FIG. 23 is a flowchart showing the process performed by a visualizing module.

FIG. 23 is a flowchart showing the process performed by the visualizing module 29. The visualizing module 29 first initializes an output screen (step S51). Then, the visualizing module 29 sets the horizontal (x) and the vertical (Y) axes of a graph to the contents selected by a user (step S52), and inputs the form of the graph selected by the user (step S53). As the form of the graph, a line graph, a bar chart, a pie chart, etc. can be cited. For the pie chart, the contents represented by one circle and those represented by a plurality of circles are selected instead of the contents represented by the horizontal and the vertical axes.

Next, the visualizing module 29 displays the number of hits corresponding to the selected contents as the selected graph form (step S54), and checks whether or not a portion of the graph has been clicked (step S55). If the graph has been clicked, the visualizing module 29 displays the result list corresponding to the clicked portion (step S56).

Then, the visualizing module 29 determines whether or not the user selects a different graph form (step S57). If the different graph form is selected, the visualizing module 29 repeats the operations in and after step S53. If the different graph form is not selected, the visualizing module 29 determines whether or not to continue the graph display (step S58). If the visualizing module 29 determines to continue the graph display, it repeats the operations in and after step S52. If the visualizing module 29 determines not to continue the graph display, it terminates the process. Whether or not to continue the graph display is determined, for example, based on the instruction from the user.

Figure 24:
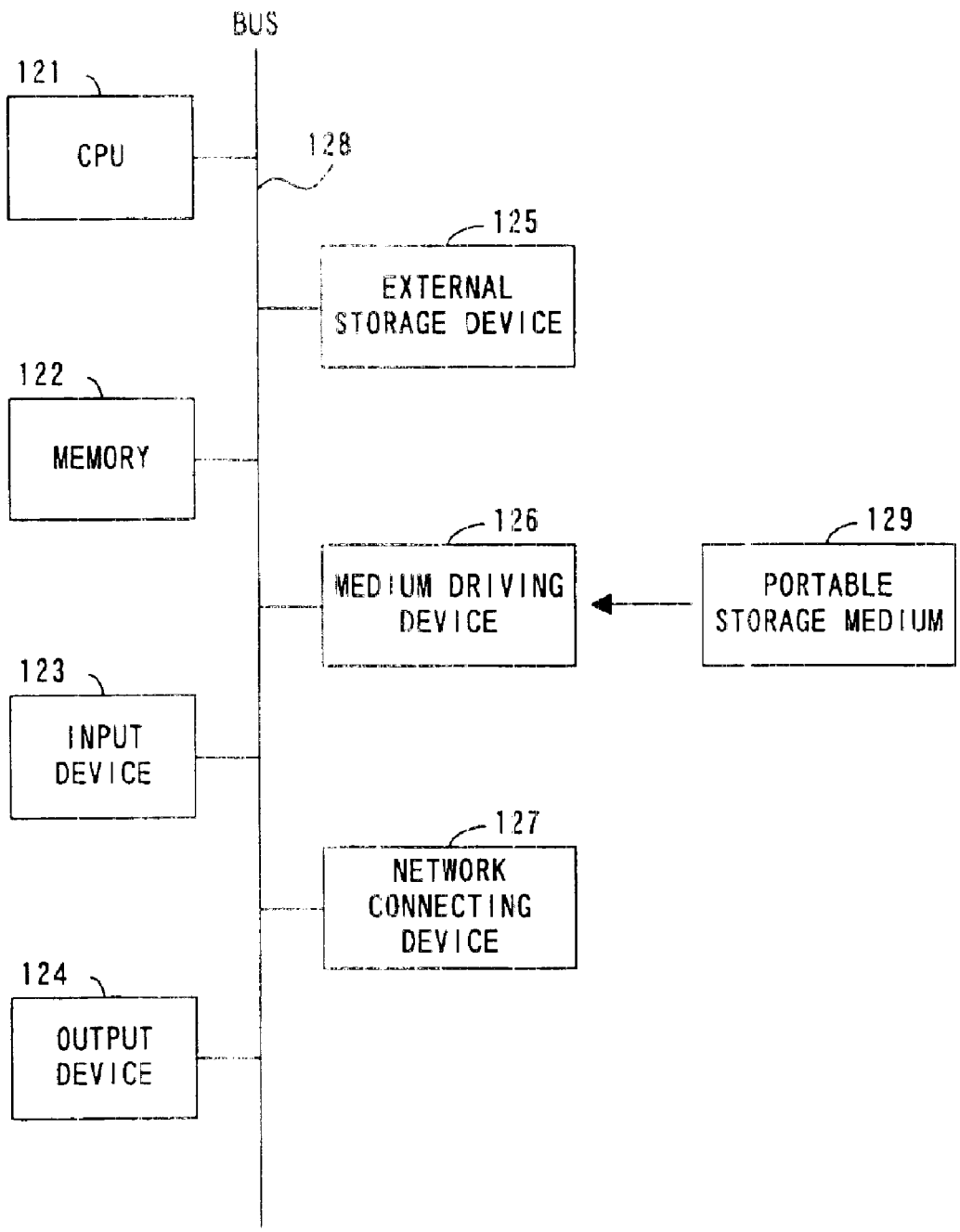
FIG. 24 is a block diagram showing the configuration of an information processing device.

The search system according to this preferred embodiment can be configured by using an information processing device (computer) shown in FIG. 24. The information processing device shown in this figure comprises a CPU (Central Processing Unit) 121, a memory 122, an input device 123, an output device 124, an external storage device 125, a medium driving device 126, and a network connecting device 127, which are interconnected by a bus 128.

The memory 122 includes, for example, a ROM (Read Only Memory), a RAM (Random Access Memory), etc., and stores programs and data used for processing. The CPU 121 performs necessary processing by executing the programs with the memory 122.

Figure 20:
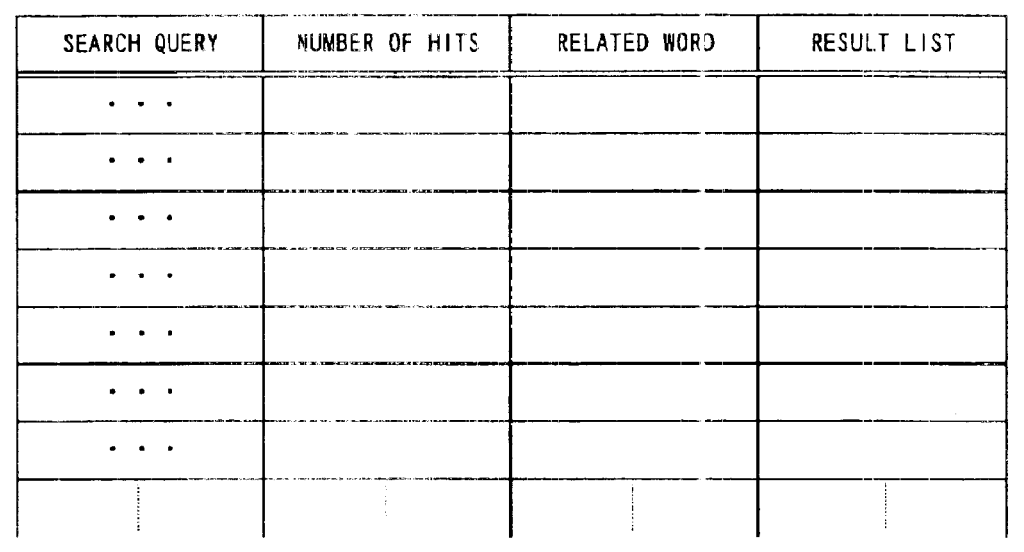

In this case, the search engine 24, the multi-dimensional input module 25, the automatic search expression generation module 26, the search result switching module 27, the multi-dimensional output module 28, and the visualizing module 29, which are shown in FIG. 2B, correspond to the software components implemented by the sets of instructions stored in specific program code segments in the memory 122. Additionally, the input arrays shown in FIGS. 17 and 18 and the search array shown in FIG. 20 are arranged in the memory 122.

The input device 123 is, for example, a keyboard, a pointing device, a touch panel, etc., and is used to input the instruction or the information from a user. The output device 124 is, for example, a display, a printer, a speaker, etc., and is used to output a message to a user or a process result.

The external storage device 125 is, for example, a magnetic disk device, an optical disk device, a magneto-optical disk device, etc. The information processing device may store the above described programs and data in the external storage device 124, and can use them by loading into the memory 122 depending on need. Additionally, the external storage device 125 may be used also as a text database 23 shown in FIG. 2B.

The medium driving device 126 drives a portable storage medium 129, and accesses its stored contents. As the portable storage medium 129, an arbitrary computer-readable storage medium such as a memory card, a floppy disk, a CD-ROM (Compact Disk-Read Only Memory), an optical disk, a magneto-optical disk, etc. is used. A user may store the above described programs and data in the portable storage medium 129, and can use them by loading into the memory 122 as occasion demands.

The network connecting device 127 communicates with an external device via an arbitrary network (line), and performs data conversion accompanying a communication. The information processing device receives the above described programs and data from an external device via the network connecting device 127, and can use them by loading into the memory 122 depending on need.

FIG. 25 shows computer-readable storage media which can provide programs and data to the information processing device shown in FIG. 24. The programs and data stored in the portable storage medium 129 or an external database 130 are loaded into the memory 122. The CPU 121 performs necessary processing by executing the programs with the data.

The above described preferred embodiment refers to the example where documents stored in a text database are searched. The present invention, however, can be applied also to a search performed for arbitrary information such as image data, speech data, a program, etc. By way of example, for an image data search, feature information of a particular color or pattern is considered to be used instead of a keyword. For a speech data search, feature information of a particular voice or sound is considered to be used as a search condition instead of a keyword.

According to the present invention, a user interface which is easy to use and is highly efficient at a search is realized when a plurality of search results for a plurality of search condition combinations are compared in an information search.

What is claimed is:

1. A computerized search system for searching a plurality of search condition combinations in an information search comprising:

an inputting device inputting query specification information, which information collectively specifies a plurality of times a full text search is executed using the plurality of search condition combinations for a comparison of a plurality of search results from the plurality of times the full text search is executed, each of the combinations representing any search query which includes a plurality of search conditions, combined by logical operators, and an instructing device instructing the specified plurality of execution times of the full text search, and instructing text information specified by each of the combinations being searched for in each execution of the full text search, wherein the plurality of search condition combinations are input as components of a single search, making the search multi-dimensional, wherein each of the search condition combinations is not combined with any other of the search condition combinations by a logical operator, and wherein each of the search results is output as a search result which is compared with another of the search results by a user.

2. The search system according to claim 1, wherein said inputting device inputs the query specification information in table form.

3. The search system according to claim 1, further comprising:

a generating device automatically generating the plurality of search condition combinations based on the query specification information, wherein said instructing device instructs the full text search according to the plurality of search condition combinations generated by said generating device.

4. The search system according to claim 1, further comprising:

a changing device changing a portion of the search conditions included in the query specification information, wherein said instructing device instructs a selective full text search for the changed portion.

5. A computerized search system for searching a plurality of search condition combinations in an information search comprising:

an obtaining device obtaining a plurality of search results resulting from a plurality of times a full text search is executed using the plurality of search condition combinations, each of the combinations representing any search query which includes a plurality of search conditions, combined by logical operators, and text information specified by each of the combinations being searched for in each execution of the full text search, and an outputting device collectively outputting output information corresponding to the plurality of search results for a comparison of the plurality of search results, wherein the plurality of search condition combinations are input as components of a single search, making the search multi-dimensional, wherein each of the search condition combinations is not combined with any other of the search condition combinations by a logical operator, and wherein each of the search results is output as a search result which is compared with another of the search results by a user.

6. The search system according to claim 5, wherein said outputting device outputs the output information in table form.

7. The search system according to claim 5, wherein said outputting device switches and outputs at least two or more items of information among the number of hits, a related word, and a search result list, as the output information.

8. The search system according to claim 5, further comprising:

a reflecting device reflecting a search result regarding a changed portion in the output information when a portion of search conditions included in the plurality of search condition combinations is changed.

9. The search system according to claim 5, wherein said outputting device comprises a graph device outputting graph information which represents the output information.

10. The search system according to claim 9, wherein said outputting device selectively outputs a search result list corresponding to a portion of graph information of a number of hits, when said graph device outputs the graph information of the number of hits.

11. A computerized search system for searching a plurality of search condition combinations in an information search comprising:

an inputting device inputting specification information, which information collectively specifies a plurality of times a full text search is executed using the plurality of search condition combinations for a comparison of a plurality of search results from the plurality of times the full text search is executed, each of the combinations representing any search query which includes a plurality of search conditions, combined by logical operators, a searching device performing the specified plurality of execution times of the full text search, and searching for text information specified by each of the combinations in each execution of the full text search, and an outputting device collectively outputting output information corresponding to the plurality of search results, wherein the plurality of search condition combinations are input as components of a single search, making the search multi-dimensional, wherein each of the search condition combinations is not combined with any other of the search condition combinations by a logical operator, and wherein each of the search results is output as a search result which is compared with another of the search results by a user.

12. A computer-readable storage medium on which is recorded a program for causing a computer to execute a process, said process comprising:

inputting query specification information for a single search, which information collectively specifies a plurality of times a full text search is executed using a plurality of search condition combinations for a comparison of a plurality of search results from the plurality of times the full text search is executed, each of the combinations representing any search query which includes a plurality of search conditions, combined by logical operators, and instructing the specified plurality of execution times of the full text search, and instructing text information specified by each of the combinations being searched for in each execution of the full text search, wherein the plurality of search condition combinations are input as components of the single search, making the search multi-dimensional, wherein each of the search condition combinations is not combined with any other of the search condition combinations by a logical operator, and wherein each of the search results is output as a search result which is compared with another of the search results by a user.

13. A computer-readable storage medium on which is recorded a program for causing a computer to execute a process, said process comprising:

obtaining a plurality of search results in a single search, the plurality of search results corresponding to a plurality of times a full text search is executed using a plurality of search condition combinations, each of the combinations representing any search query which includes a plurality of search conditions, combined by logical operators, and text information specified by each of the combinations being searched for in the full text search, and collectively outputting output information corresponding to the plurality of search results for a comparison of the plurality of search results, wherein the plurality of search condition combinations are input as components of the single search, making the search multi-dimensional, wherein each of the search condition combinations is not combined with any other of the search condition combinations by a logical operator, and wherein each of the search results is output as a search result which is compared with another of the search results by a user.

14. A computerized search method for searching a plurality of search condition combinations in an information search comprising:

collectively specifying the plurality of search condition combinations in a full text search, each of the combinations representing any search query which includes a plurality of search conditions for text information, performing an information search based on specified information, obtaining a plurality of search results in a single search, the plurality of search results corresponding to a plurality of times a full text search is executed using the plurality of search condition combinations, each of the combinations representing any search query which includes a plurality of search conditions, combined by logical operators, and text information specified by each of the combinations being searched for in each time of the full text search, and collectively outputting output information corresponding to the plurality of search results for a comparison of the plurality of search results, wherein the plurality of search condition combinations are input as components of the single search, making the search multi-dimensional, wherein each of the search condition combinations is not combined with any other of the search condition combinations by a logical operator, and wherein each of the search results is output as a search result which is compared with another of the search results by a user.

15. A computerized search system for searching a plurality of search condition combinations in an information search comprising:

inputting means for inputting specification information for a single which collectively specifies a plurality of times a full text search is executed using the plurality of search condition combinations for a comparison of a plurality of search results from the plurality of times the full text search is executed, each of the combinations representing any search query which includes a plurality of search conditions, combined by logical operators, and instructing means for instructing the specified plurality of times the full text search is executed, and instructing text information specified by each of the combinations being searched for in each time of the full text search, wherein the plurality of search condition combinations are input as components of a single search, making the search multi-dimensional, wherein each of the search condition combinations is not combined with any other of the search condition combinations by a logical operator, and wherein each of the search results is output as a search result which is compared with another of the search results by a user.

16. A computerized search system for searching a plurality of search condition combinations in an information search comprising:

obtaining means for obtaining a plurality of search results corresponding to a plurality of times a full search is executed using the plurality of search condition combinations, each of the combinations representing any search query which includes a plurality of search conditions, combined by logical operators, and text information specified by each of the combinations being searched for in each time of the full text search, and outputting means for collectively outputting output information corresponding to the plurality of search results for a comparison of the plurality of search results, wherein the plurality of search condition combinations are input as components of a single search, making the search multi-dimensional, wherein each of the search condition combinations is not combined with any other of the search condition combinations by a logical operator, and wherein each of the search results is output as a search result which is compared with another of the search results by a user.

17. A computerized search system for searching a plurality of search condition elements in an information search comprising:

an inputting device inputting, as part of a single search multi-dimensional query specification information which specifies a plurality of times a full text search is executed using a plurality of search condition types for a comparison of a plurality of search results from the plurality of times of the full text search, at least one of the search condition types including the plurality of search condition elements, and a plurality of queries specified by all combinations of each of the search condition elements in each of the search condition types, and an instructing device instructing the specified plurality of times the full text search is executed, and instructing text information specified by each of the plurality of queries being searched for in each time of the full text search, wherein respective search condition elements are combined by logical operators in each of the queries, wherein each of the queries is not combined with any other of the queries by a logical operator, and wherein each of the search results is output as a search result which is compared with another of the search results by a user.

18. A computerized search system for searching a plurality of search condition elements an information search comprising:

an obtaining device obtaining a plurality of search results, within a single search, for a plurality of times a full text search is executed, using a plurality of queries specified by all combinations of each of the search condition elements in each of the search condition types, text information specified by each of the plurality of queries being searched for in each execution of the full text search, and multi-dimensional query specification information specifying a plurality of search condition types, at least one of the search condition types including the plurality of search condition elements, and an outputting device collectively outputting output information corresponding to the plurality of search results for a comparison, wherein respective search condition elements are combined by logical operators in each of the queries, wherein each of the queries is not combined with any other of the queries by a logical operator, and wherein each of the search results is output as a search result which is compared with another of the search results by a user.

19. A computerized search system for searching a plurality of search conditions in an information search comprising:

an inputting device inputting a number of dimensions of an input array, each of the dimensions having a number of elements and the plurality of search conditions, and registering the input search conditions to the input array;

a generating device automatically generating a plurality of search expressions which cover all possible combinations of the search conditions registered to the input array, by combining each search condition in each of the dimensions with each search condition in another of the dimensions by a logical operator; and an instructing device instructing a plurality of times a full text search is executed, each of which is specified by each of the search expressions, to obtain respective search results, each of which is compared with another of the search results by a user.

* * * * *

UNITED STATES PATENT AND TRADEMARK OFFICE
CERTIFICATE OF CORRECTION

PATENT NO. : 6,904,427 B1
DATED : June 7, 2005
INVENTOR(S) : Junichi Hagiwara

It is certified that error appears in the above-identified patent and that said Letters Patent is hereby corrected as shown below:

Column 13,
Line 41, delete "query".

Column 16,
Line 39, delete "for a single".

Signed and Sealed this

Fourth Day of October, 2005

JON W. DUDAS
*Director of the United States Patent and Trademark Office*